US012052076B2

(12) United States Patent
Raghavan et al.

(10) Patent No.: US 12,052,076 B2
(45) Date of Patent: Jul. 30, 2024

(54) METHODS FOR CONVEYING ADDITIONAL INFORMATION VIA BEAM PERMUTATIONS

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/304,697

(22) Filed: Apr. 21, 2023

(65) Prior Publication Data

US 2023/0387984 A1    Nov. 30, 2023

Related U.S. Application Data

(63) Continuation of application No. 17/180,675, filed on Feb. 19, 2021, now Pat. No. 11,664,866.

(51) Int. Cl.
*H04B 7/06* (2006.01)
*H04B 7/08* (2006.01)
*H04B 17/318* (2015.01)

(52) U.S. Cl.
CPC ......... *H04B 7/0617* (2013.01); *H04B 7/0632* (2013.01); *H04B 7/088* (2013.01); *H04B 17/318* (2015.01)

(58) Field of Classification Search
CPC .... H04B 7/0617; H04B 7/0632; H04B 7/088; H04B 17/318; H04B 7/063; H04B 7/0695

(Continued)

(56) References Cited

U.S. PATENT DOCUMENTS

| 11,664,866 B2 * | 5/2023 | Raghavan ............... H04B 7/088 375/267 |
| 2013/0182683 A1 * | 7/2013 | Seol ..................... H04B 7/0695 370/335 |

(Continued)

FOREIGN PATENT DOCUMENTS

WO    2018101915 A1    6/2018

OTHER PUBLICATIONS

International Search Report and Written Opinion—PCT/US2022/070643—ISA/EPO—May 30, 2022.

*Primary Examiner* — Fitwi Y Hailegiorgis
(74) *Attorney, Agent, or Firm* — Arun Swain

(57) ABSTRACT

Aspects are provided which allow a transmitting device to provide reference signals to a receiving device for beam management according to an arbitrarily determined sequence of transmission beams at any time, and to implicitly convey information regarding the determined sequence of transmission beams to the receiving device. The transmitting device provides a message to the receiving device indicating a beam sequence conveyance mode. The transmitting device subsequently determines a sequence of different transmission beams, and associates a reference signal with each one of the transmission beams for transmission to the receiving device according to the sequence. The receiving device obtains the plurality of reference signals from the transmitting device, where each of the reference signals is associated with a different transmission beam. The receiving device identifies a reception beam for each of the transmission beams, and determines a sequence of the transmission beams in response to the identification.

20 Claims, 16 Drawing Sheets

(58) Field of Classification Search
USPC .......................................................... 375/267
See application file for complete search history.

(56) References Cited

U.S. PATENT DOCUMENTS

| | | |
|---|---|---|
| 2016/0360463 A1* | 12/2016 | Kim .................. H04W 72/0446 |
| 2018/0048375 A1 | 2/2018 | Guo et al. |
| 2018/0049245 A1 | 2/2018 | Islam et al. |
| 2020/0014452 A1 | 1/2020 | Gao et al. |
| 2020/0178280 A1 | 6/2020 | Guan et al. |
| 2022/0015082 A1 | 1/2022 | Farag et al. |
| 2022/0271809 A1 | 8/2022 | Raghavan et al. |

* cited by examiner

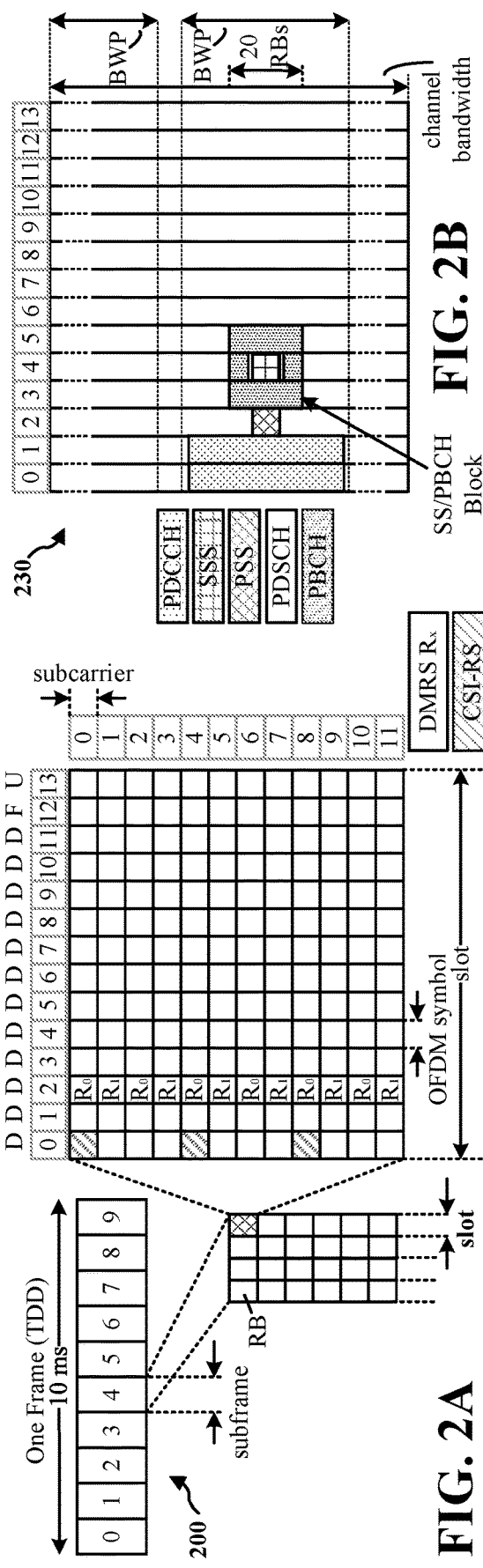
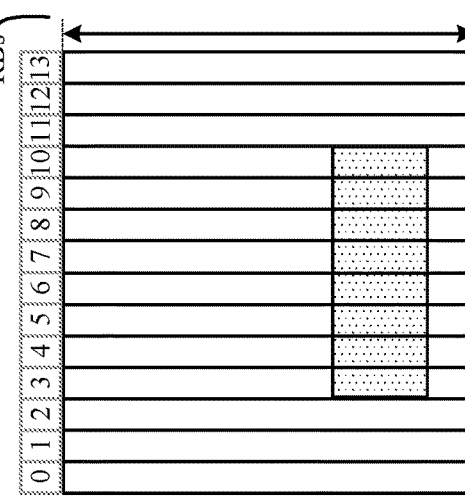
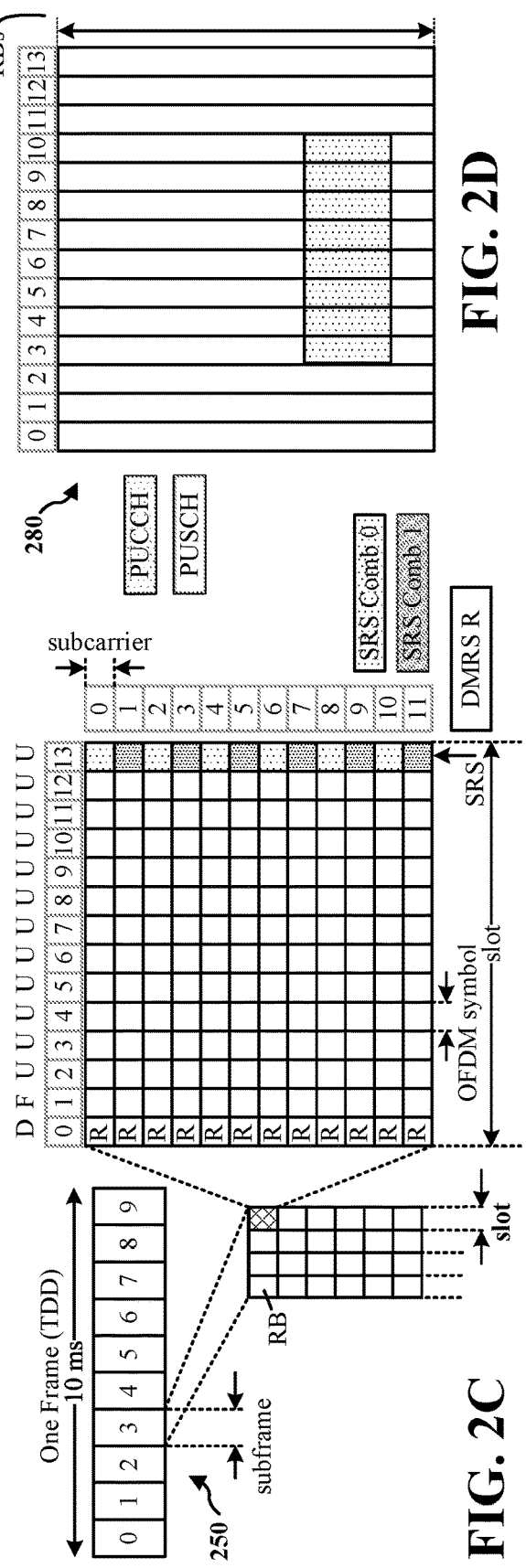
FIG. 2A
FIG. 2B
FIG. 2C
FIG. 2D

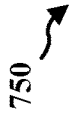
FIG. 7A
FIG. 7B

METHODS FOR CONVEYING ADDITIONAL INFORMATION VIA BEAM PERMUTATIONS

CROSS-REFERENCE TO RELATED APPLICATION

The present Application for Patent is a continuation of U.S. patent application Ser. No. 17/180,675, filed on Feb. 19, 2021, and assigned to the assignee hereof. The disclosure of the prior Application is considered part of and is incorporated by reference into this Patent Application.

BACKGROUND

Technical Field

The present disclosure generally relates to communication systems, and more particularly, to communication between wireless devices such as a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device, such as a UE, a relay or sidelink node, a customer-premises equipment (CPE), a repeater, or an integrated access and backhaul (IAB) node, which includes multiple antennas that may receive data over any given carrier frequency. The first wireless device may also be a base station or a transmission reception point (TRP). The first wireless device obtains a plurality of reference signals from a second wireless device, where each of the reference signals is associated with a different transmission beam. The reference signals may be, for example, channel state information (CSI) reference signals (CSI-RS) (e.g., if first wireless device is a UE) or sounding reference signals (SRS) (e.g., if first wireless device is a base station). The first wireless device identifies a reception beam for each of the transmission beams and determines a sequence of the transmission beams in response to the identification. The identified reception beams comprise different reception beams or at least one common reception beam.

In an aspect of the disclosure, a method, a computer-readable medium, and an apparatus are provided. The apparatus may be a first wireless device, such as a base station, a TRP, a repeater, or an IAB node, which includes multiple antennas that may transmit data over any given carrier frequency. The first wireless device provides a message to a second wireless device indicating a beam sequence conveyance mode. The first wireless device determines a sequence of different transmission beams, and associates a reference signal with each one of the transmission beams for transmission to the second wireless device according to the sequence. The reference signals may be, for example, channel state information (CSI) reference signals (CSI-RS).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 7A-7B are diagrams illustrating examples of CSI-RS symbols which the base station transmits according to different sequences of transmission beams, where during each symbol the UE performs four signal strength measurements over different reception beams.

DETAILED DESCRIPTION

Figure 1:
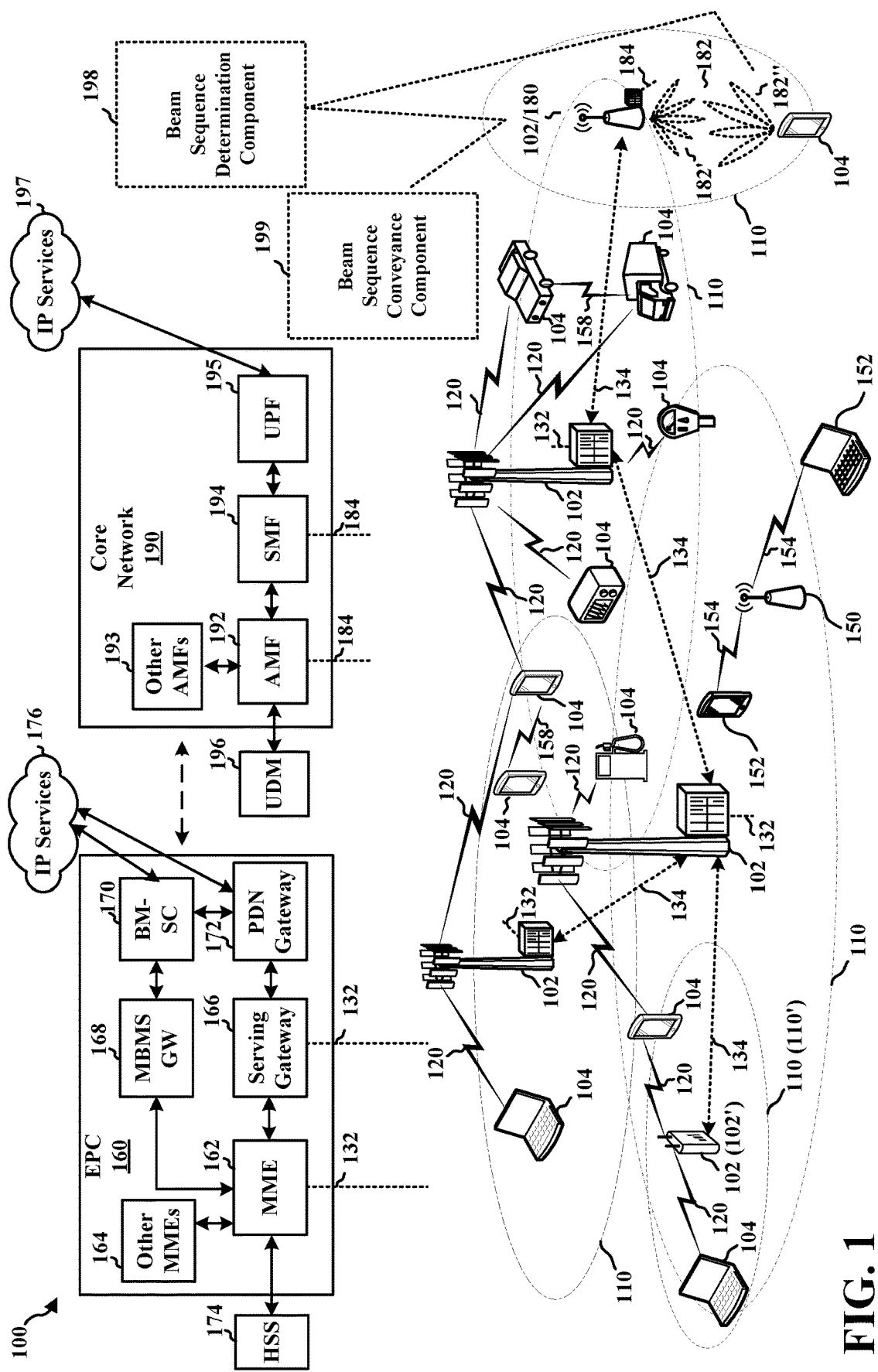
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In millimeter wave (mmW) frequencies (e.g., frequency range 2 (FR2) or beyond), a UE and base station may perform beamforming to improve gain and reliability of transmissions and to improve reception of transmitted signals. To establish and retain an optimal beam pair (a transmission beam and a corresponding reception beam) for strong connectivity, the UE and base station may perform various beam management procedures. Such procedures may include, for instance, beam training (also referred to as a P1 procedure), transmission beam refinement (also referred to as a P2 procedure), and reception beam refinement (also referred to as a P3 procedure).

In beam training, a base station transmits a burst of synchronization signal blocks (SSBs) to a UE. The base station may transmit each SSB over a different transmission beam (referred to as transmission beam sweeping), and the UE may receive each SSB over multiple reception beams (referred to as reception beam sweeping). During transmission or reception beam sweeping, the UE determines K beam pairs (of transmission and reception beams) which result in the highest signal strength (e.g., reference signal received power (RSRP) or received signal strength indicator (RSSI)) (i.e., the K best beam pairs). Upon determining the K best beam pairs, the UE reports these pair(s) to the base station in random access channel (RACH) occasions corresponding to the SSB(s) associated with the best beam pairs.

Following beam training, the base station and UE may perform transmission beam refinement or reception beam refinement. In transmission beam refinement, a transmitting device sends multiple reference signal symbols (e.g., symbols carrying CSI-RS or SRS) respectively over different transmission beams, and a receiving device receives each reference signal symbol over a fixed reception beam. Contrarily, in reception beam refinement, the transmitting device sends multiple reference signal symbols over a fixed transmission beam, and the receiving device receives each reference signal symbol respectively over different reception beams. The transmitting device and receiving device may be a base station and UE, respectively, or vice-versa. During transmission beam or reception beam refinement, the receiving device determines the beam pair resulting in the highest signal strength (e.g., the best beam pair from the K best beam pairs), and the receiving device reports this beam pair to the transmitting device. The base station and UE may then use this beam pair as a serving beam pair for downlink and uplink data transmission (e.g., in a physical downlink shared channel (PDSCH) or a physical uplink shared channel (PUSCH)), with the remaining best beam pairs serving as fallback options for diversity in the case of blockage, fading, etc., or other purposes (e.g., higher layer transmissions). For example, if the UE detects a beam failure in the serving beam pair, the UE and base station may switch to one of the remaining beam pairs during beam failure recovery. Moreover, during beam tracking or beam management, the UE may perform a low overhead scan of the K best beam pairs periodically during radio link monitoring (RLM) (typically by measuring signal strength of CSI-RS symbols) in order to maintain updated beam pairs for subsequent beam refinement.

Thus, during beam management, a transmitting device may provide reference signals over various transmission beams for a receiving device to perform beam signal strength measurements. However, a transmitting device generally does not convey information to the receiving device regarding the sequence of the various transmission beams. Rather, the transmitting device generally selects the transmission beams according to a fixed sequence that is pre-configured prior to beam management, and the transmitting device does not arbitrarily change this beam sequence. Moreover, the transmitting device typically provides reference signals during beam management in response to conditions such as blockage or interference or other factors triggering beam failure recovery, rather than unconditionally at any time.

Hence, aspects of the present disclosure allow a transmitting device to provide reference signals to a receiving device for beam management according to an arbitrarily determined sequence of transmission beams at any time. Aspects of the present disclosure also allow the transmitting device to implicitly convey information regarding the determined sequence of transmission beams to the receiving device. The transmitting device may implicitly convey information regarding transmission beam sequences during beam management if the receiving device is capable of performing multiple, simultaneous radio frequency (RF) signal strength measurements of reference signals during each symbol. Such implicit conveyance of transmission beam sequences may result in reduced overhead compared to explicit messages indicating the beam sequence, thereby saving resources. Moreover, the transmitting device may change a transmission beam sequence (e.g., to a sequence other than a pre-configured sequence for beam management) at any time, regardless of blockage or interference or similar beam failure conditions, since the receiving device may be able to determine the sequence during the measurement process.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 or base station 180 may include a beam sequence determination component 198 that is configured to obtain a plurality of reference signals from a wireless device (e.g., a UE or base station), where each of the reference signals is associated with a different transmission beam. The beam sequence determination component is also configured to identify a reception beam for each of the transmission beams, where the identified reception beams comprise different reception beams or at least one common reception beam, and determine a sequence of the transmission beams in response to the identification.

Still referring to FIG. 1, in certain aspects, the base station 180 may include a beam sequence conveyance component 199 that is configured to provide a message to a wireless device (e.g., a UE) indicating a beam sequence conveyance mode. The beam sequence conveyance component is also configured to determine a sequence of different transmission beams, and associate a reference signal with each one of the transmission beams for transmission to the wireless device according to the sequence.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

Other wireless communication technologies may have a different frame structure and/or different channels. A frame, e.g., of 10 milliseconds (ms), may be divided into equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
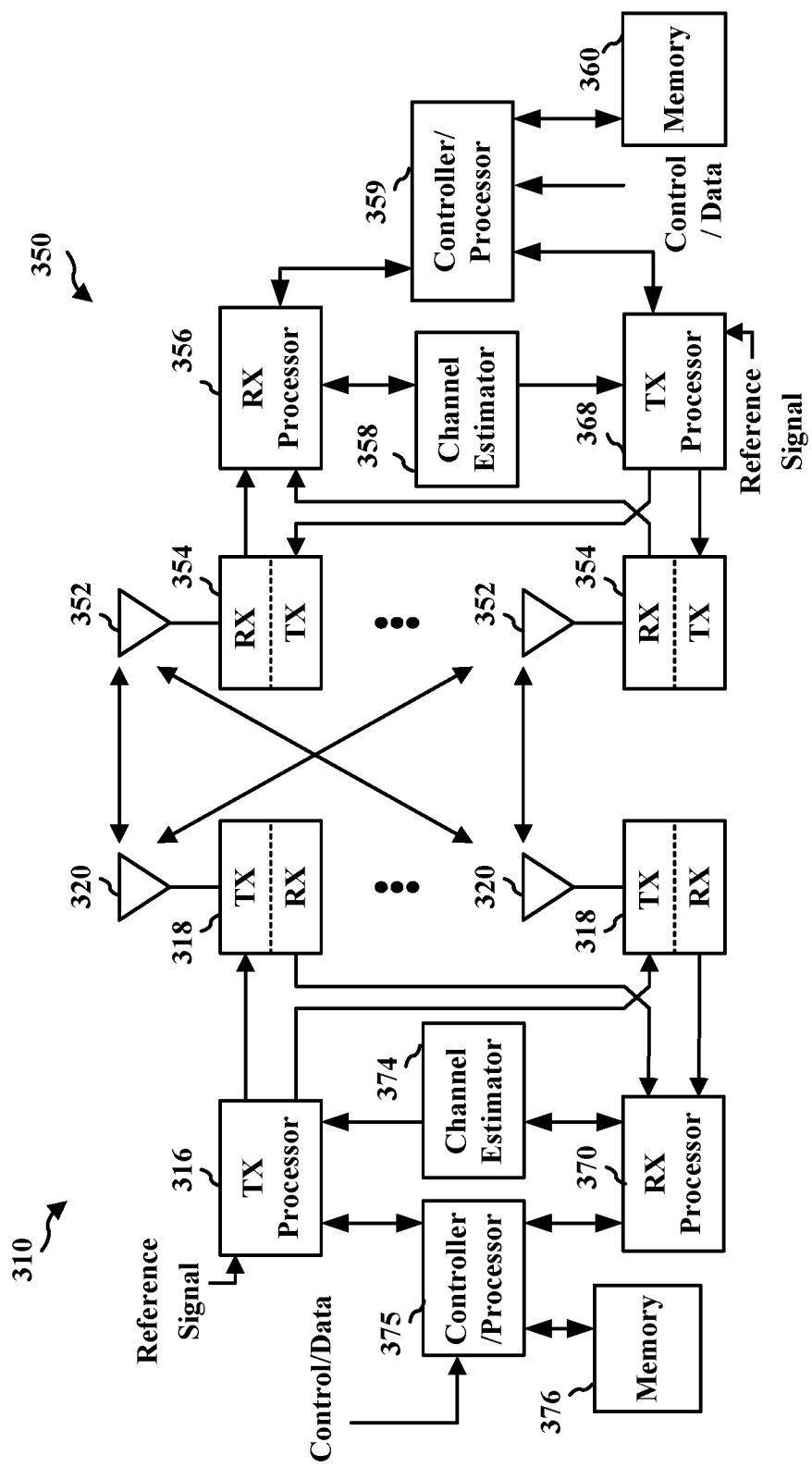
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, 368, the RX processor 356, 370, and the controller/processor 359, 375 may be configured to perform aspects in connection with beam sequence determination component 198 of FIG. 1.

At least one of the TX processor 316, the RX processor 370, and the controller/processor 375 may be configured to perform aspects in connection with beam sequence conveyance component 199 of FIG. 1.

In mmW frequencies (e.g., FR2 or beyond), a UE and base station may perform beamforming to improve gain and reliability of transmissions and to improve reception of transmitted signals. To establish and retain an optimal beam pair (a transmission beam and a corresponding reception beam) for strong connectivity, the UE and base station may perform various beam management procedures. Such procedures may include, for instance, beam training (also referred to as a P1 procedure), transmission beam refinement (also referred to as a P2 procedure), and reception beam refinement (also referred to as a P3 procedure).

In beam training, a base station transmits a burst of SSBs to a UE. The base station may transmit each SSB over a different transmission beam (referred to as transmission beam sweeping), and the UE may receive each SSB over multiple reception beams (referred to as reception beam sweeping). During transmission or reception beam sweeping, the UE determines K pairs of transmission and reception beams which result in the highest signal strength (e.g., RSRP or RSSI) (i.e., the K best beam pairs). Upon determining the K best beam pairs, the UE reports these pair(s) to the base station in RACH occasions corresponding to the SSB(s) associated with the best beam pairs.

Figure 4:
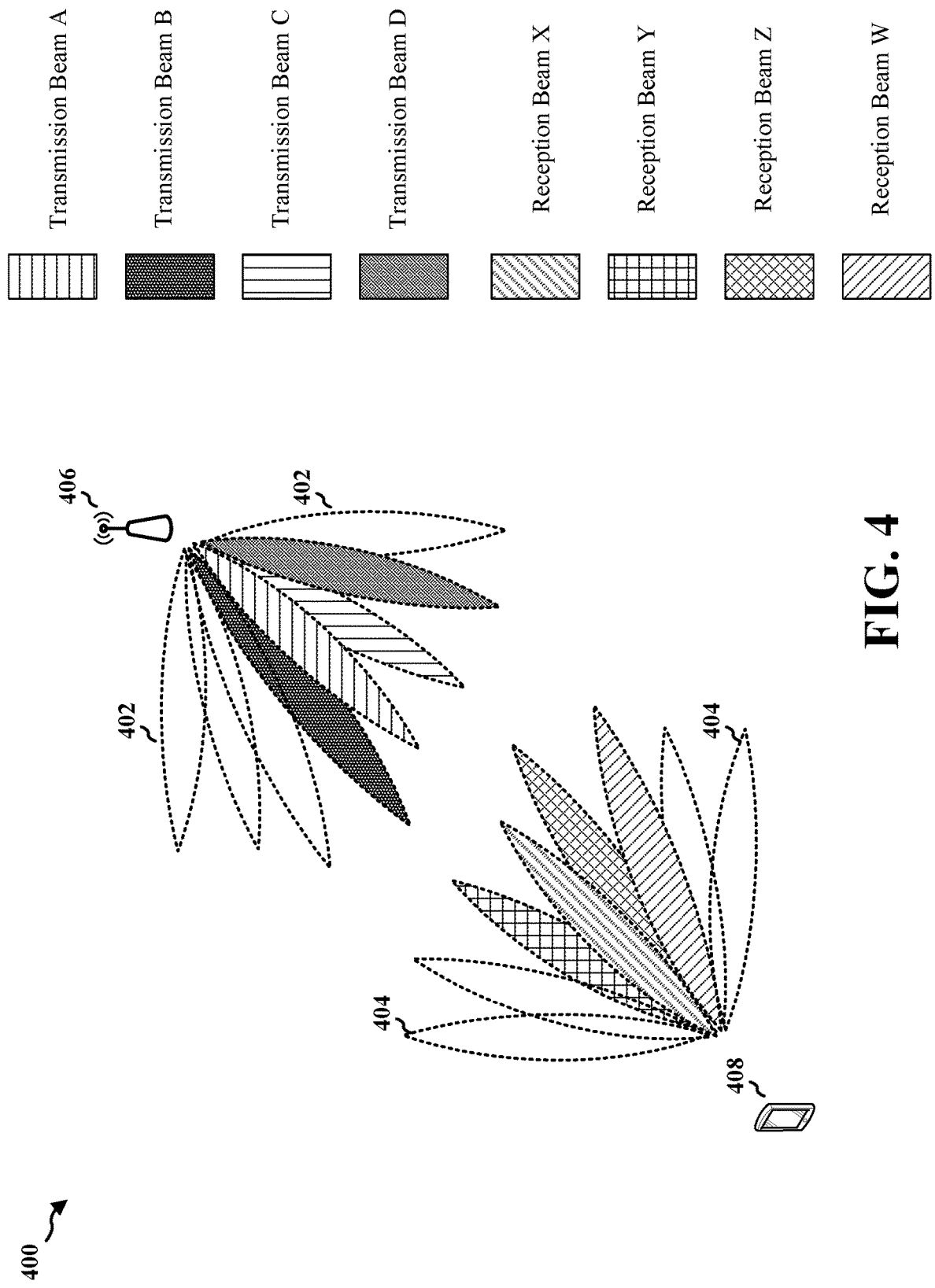
FIG. 4 is a diagram illustrating an example of transmission beams from a base station and reception beams from a UE.

FIG. 4 illustrates an example 400 of transmission beams 402 and reception beams 404 respectively swept by a base station 406 and UE 408 during beam training. In this example, the base station may transmit SSBs over multiple transmission beams each having a potentially different direction, including transmission beams A, B, C, and D. Similarly, the UE may receive each SSB over multiple reception beams each having a potentially different direction, including reception beams X, Y, Z, and W. The UE may measure signal strengths for each pair of transmission beams and reception beams. For instance, the UE may measure signal-to-noise ratios (SNRs) associated with beam pairs AX (transmission beam A and reception beam X), AY, AZ, and AW, followed by BX, BY, BZ, and BW, and so forth. Afterwards, the UE may determine the K beam pairs having the highest signal strength out of the various measured signal strengths. For instance, the UE may determine that the beam pairs having the four highest signal strengths (i.e., K=4) include AX, BY, CZ, and DW. The UE may subsequently report these best beam pairs to the base station in corresponding RACH occasions.

Following beam training, the base station and UE may perform transmission beam refinement or reception beam refinement. In transmission beam refinement, a transmitting device sends multiple reference signal symbols (e.g., symbols carrying CSI-RS or SRS) respectively over different transmission beams, and a receiving device receives each reference signal symbol over a fixed reception beam. Contrarily, in reception beam refinement, the transmitting device sends multiple reference signal symbols over a fixed transmission beam, and the receiving device receives each reference signal symbol respectively over different reception beams. The transmitting device and receiving device may be a base station and UE, respectively, or vice-versa. During transmission beam or reception beam refinement, the receiving device determines the beam pair resulting in the highest signal strength (e.g., the best beam pair from the K best beam pairs), and the receiving device reports this beam pair to the transmitting device. The base station and UE may then use this beam pair as a serving beam pair for downlink and uplink data transmission (e.g., in a PDSCH or a PUSCH), with the remaining best beam pairs serving as fallback options for diversity in case of blockage, fading, etc., or other purposes. For example, if the UE detects a beam failure in the serving beam pair, the UE and base station may switch to one of the remaining beam pairs during beam failure recovery. Moreover, during beam tracking or beam management, the UE may perform a low overhead scan of the K best beam pairs periodically during RLM (typically by measuring signal strength of CSI-RS symbols) in order to maintain updated beam pairs for subsequent beam refinement.

Thus, during beam management, a transmitting device may provide reference signals over various transmission beams for a receiving device to perform beam signal strength measurements. However, a transmitting device generally does not convey information to the receiving device regarding the sequence of the various transmission beams. Rather, the transmitting device generally selects the transmission beams according to a fixed sequence that is pre-configured prior to beam management, and the transmitting device does not arbitrarily change this beam sequence unless indicated so by the receiving device in the form of a beam switch request or command. Moreover, the transmitting device typically provides reference signals during beam management in response to conditions such as blockage or interference or other factors triggering beam failure recovery, rather than unconditionally at any time.

Hence, aspects of the present disclosure allow a transmitting device to provide reference signals to a receiving device for beam management according to an arbitrarily determined sequence of transmission beams at any time. Aspects of the present disclosure also allow the transmitting device to implicitly convey information regarding the determined sequence of transmission beams to the receiving device. The transmitting device may implicitly convey information regarding transmission beam sequences during beam management if the receiving device is capable of performing multiple, simultaneous RF signal strength measurements of reference signals during each symbol. Such implicit information conveyance of transmission beam sequences may result in increased data rates achievable without a need for explicit messages indicating the beam sequence by taking advantage of the device capability to perform multiple, simultaneous RF measurements. Moreover, the transmitting device may change a transmission beam sequence (e.g., to a sequence other than a pre-configured sequence for beam management) at any time, regardless of blockage or interference or similar beam failure conditions, since the receiving device may be able to determine the sequence during the measurement process.

In one example, a UE may provide a capability report to a base station indicating that the UE is capable of performing multiple simultaneous signal strength measurements during a symbol length. In response to the capability report, the base station may provide a message to the UE indicating a beam sequence information conveyance mode. Based on the message, the UE may determine that subsequent symbols will convey information for signal strength measurements for beam management (e.g., CSI-RS), as well as information regarding a transmission beam sequence arbitrarily determined by the base station. Moreover in response to the message, the UE may provide to the base station a set of distinguishable beam pairs, e.g., the K best beam pairs obtained during beam training which meet certain signal strength conditions as described below with respect to FIG. 5.

Next, the base station may determine a sequence of transmission beams from the distinguishable beam pairs. Subsequently, during beam management, the base station may provide CSI-RS symbols to the UE over different transmission beams according to the determined beam sequence. The UE may perform multiple, simultaneous RF measurements of RSRP or RSSI (or an equivalent signal strength metric) during each CSI-RS symbol for different reception beams, in response to which measurements the UE may identify the reception beams corresponding to distinguishable beam pairs. The UE may then determine the sequence of transmission beams in response to the identified reception beams. In this way, beam management according to arbitrarily determined transmission beam sequences for CSI-RS may be achieved.

Such a process may be similarly applied for SRS if the base station is able to perform multiple, simultaneous RF measurements during each SRS symbol, in which case the base station may similarly determine a sequence of transmission beams implicitly conveyed by the UE. For example, during beam management, the UE may provide SRS symbols to the base station over different transmission beams according to a beam sequence arbitrarily determined by the UE. The base station may then perform multiple, simultaneous RF measurements of RSRP or RSSI (or an equivalent signal strength metric) during each SRS symbol for different reception beams, in response to which measurements the base station may identify the reception beams corresponding to distinguishable beam pairs. The base station may then determine the sequence of transmission beams in response to the identified reception beams. In this way, beam management according to arbitrarily determined transmission beam sequences for SRS may similarly be achieved.

A receiving device (e.g., a UE or base station) may include RF circuitry or other capability that allows the receiving device to perform multiple, simultaneous RF measurements during a symbol length. In one example, the receiving device may include multiple RF chains (e.g., multiple mixers, analog-to-digital converters (ADCs), digital-to-analog converters (DACs), or other components). Multiple RF chains may allow for higher data rates (e.g. higher numbers of layers or data streams), improved diversity and robustness, hybrid beamforming, and other improvements in comparison to a single RF chain. With multiple RF chains, the receiving device may independently perform beam scanning across the different RF chains. However, such capability may result in higher cost, larger usage of on-chip area, and higher power consumption than a single RF chain system. In another example, the network may allow the receiving device to process sub-symbol level information (or the receiving device may be capable of such processing). For example, a base station may provide PSS, SSS, and DM-RS in PBCH at 240 kHz or larger subcarrier spacing (SCS), which the UE may measure multiple times over a single SSB occasion in contrast to data or control information provided at 120 kHz or smaller SCS. Hence, the UE may measure PSS, SSS, and DM-RS in SSBs sub-symbol (i.e., multiple times in a symbol at 120 kHz or smaller SCS). In a further example, the receiving device may include RF circuitry that does not incorporate mixers, ADCs, DACs, or other components typical in an RF chain (and thus does not include circuitry for down converting received signals to intermediate frequencies (IF) or baseband frequencies and further processing), but may still allow for RF measurements. Such RF circuitry may typically be found in wake-up receivers (WURs), which are common in FR2 as well as FR1 to provide power savings. For instance, WURs do not demodulate signals but typically search for power indicating a signal strength spike at a particular frequency, and if power is detected (e.g., a measured RSRP is above a threshold), the WUR wakes up a full receiver of the device to decode the paging channel the next time the page is sent. The receiving device may include such WUR RF circuitry. In an additional example, the receiving device may include autonomous beam search circuitry, such as used in radar systems. This circuitry may be implemented in the form of one or more self-steering arrays that have a state machine which rapidly cycles through several beam directions and detects the received signal amplitude in each direction.

Thus, a receiving device may include multiple RF chains, include sub-symbol level processing capability, include WUR RF circuitry, include autonomous beam search circuitry, or include other power detector(s) that allow the receiving device to measure signal strengths over different reception beams multiple times during a symbol length. Nevertheless, some challenges remain in that power detectors tend to have limited dynamic range, wide bandwidth requiring good filters, or more limited dynamic range in on-chip detectors than test equipment power detectors. However, in cases where the signal strength of received signals (e.g., RSSI) is sufficiently high, or in cases where appropriate filtering is present before the signal reaches the detector, the receiving device may incorporate any of the aforementioned circuitry or similar capability (e.g., power, voltage, or current detectors) to perform multiple RF measurements during a symbol length.

During beam training as described above, a receiving device may measure SNRs for multiple pairs of transmission (Tx) beams and reception (Rx) beams and identify the K best beam pairs. Following measurement of the SNRs, the receiving device may determine whether any of these best beam pairs are distinguishable beam pairs. For example, the receiving device may identify a set of L distinguishable beam pairs, where L≤K. A set of distinguishable beam pairs may be defined to include those best beam pairs (TxBeam(i), RxBeam(i)) associated with an SNR(i) for i=1 to L, where the difference between SNR(i) and a maximum SNR out of the SNRs associated with beam pairs (TxBeam(i), RxBeam(j)) for j≠i is larger than or equal to a signal strength threshold $SNR_{threshold}$. For example, if beam pairs AX, AY, AZ, and AW are respectively associated with SNRs 25 dB, 12 dB, 4 dB, and −2 dB respectively, where $SNR_{threshold}$=7 dB, then best beam pair AX is a distinguishable beam pair since the difference between its SNR (i.e., 25 dB) and the maximum SNR out of the SNRs associated with the other beam pairs AY, AZ, and AW (i.e., 12 dB, leading to a difference of 25−12=13 dB) exceeds $SNR_{threshold}$ (i.e., 13 dB>7 dB). Thus, distinguishable beam pairs may be considered to be best beam pairs having SNRs which are distinguishably higher (relative to $SNR_{threshold}$) than those of other beam pairs sharing a same transmission beam. $SNR_{threshold}$ may be a pre-configured signal strength threshold which the receiving device may determine. Alternatively, the transmitting device may configure and provide $SNR_{threshold}$ to the receiving device. After the receiving device identifies the distinguishable beam pairs during the beam training process, the receiving device may report the set of distinguishable beam pairs to the transmitting device.

Figure 5:
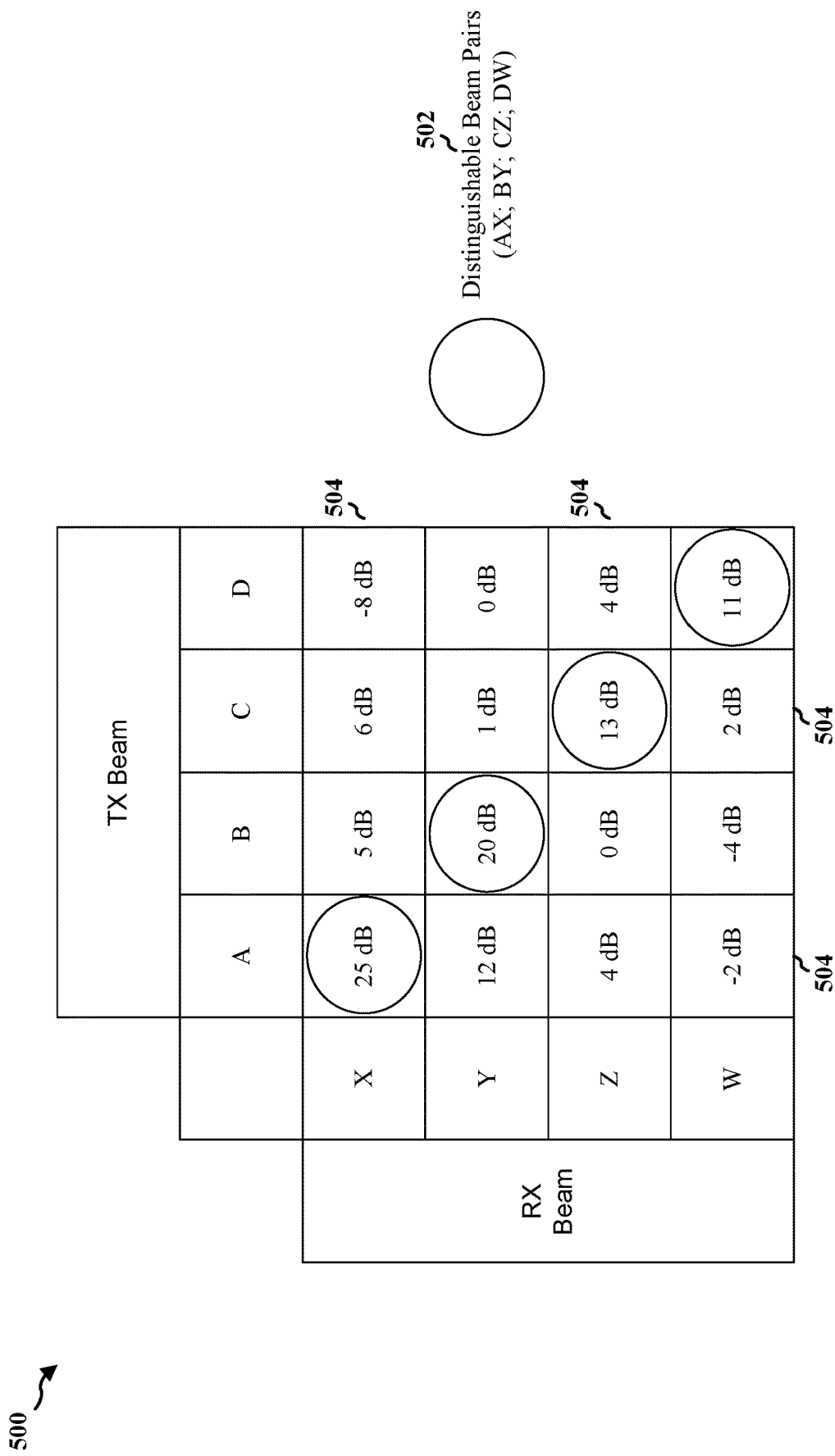
FIG. 5 is a diagram illustrating an example of distinguishable beam pairs.

FIG. 5 illustrates an example 500 of distinguishable beam pairs 502 which a receiving device may determine during beam training. Similar to the example described above in FIG. 4, in this illustrated example the transmitting device has transmitted SSBs across four transmission beams A, B, C, D, and the receiving device has received each SSB over four reception beams X, Y, Z, W. Accordingly, the receiving device has measured SNRs 504 of sixteen beam pairs, including AX, AY, AZ, AW, BX, BY, BZ, BW, CX, CY, CZ, CW, DX, DY, DZ, and DW. Examples of an SNR measurement for each beam pair is illustrated in FIG. 5, although in other examples different SNR values may be measured. Similarly, in other examples, the transmitting device may sweep across a different number of transmission beams, the receiving device may sweep across a different number of reception beams, and the receiving device may measure SNR values for a different number of beam pairs accordingly. Here, the receiving device has determined that AX, BY, CZ, and DW are the K best beam pairs respectively for each transmission beam since these beam pairs have the highest SNRs in each column. Moreover, assuming $SNR_{threshold}$=7 dB in this example, the receiving device has determined that all of these best beam pairs are distinguishable beam pairs, since the difference between the SNR of AX and the maximum SNR of (AY, AZ, AW), the difference between the SNR of BY and the maximum SNR of (BX, BZ, BW), the difference between the SNR of CZ and the maximum SNR of (CX, CY, CW), and the difference between the SNR of DW and the maximum SNR of (DX, DY, DZ), are all equal to or larger than $SNR_{threshold}$. Thus, following beam training, the receiving device may report to the transmitting device the best beam pairs AX, BY, CZ, and DW as a set of distinguishable beam pairs.

Figure 6:
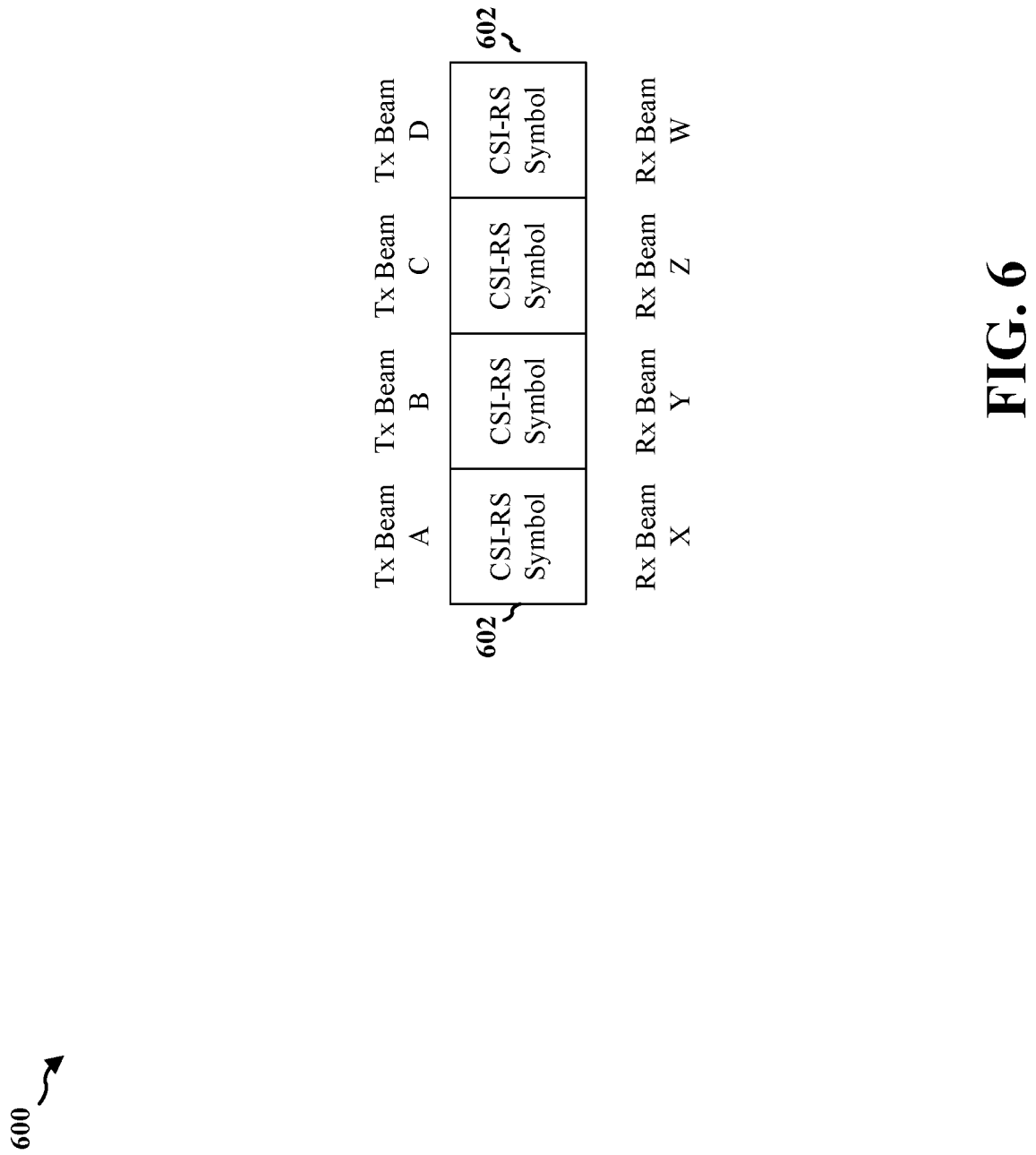
FIG. 6 is a diagram illustrating an example of CSI-RS symbols which the base station transmits according to a pre-configured sequence of transmission beams, where during each symbol the UE performs a single signal strength measurement over a different reception beam.

FIG. 6 illustrates an example 600 of CSI-RS symbols 602 that a base station may transmit to a UE during beam management (e.g., beam refinement), assuming the UE has reported AX, BY, CZ, and DW as the best L distinguishable beam pairs as described above. While this example specifically refers to CSI-RS from a base station to a UE, similar principles may apply for SRS from a UE to a base station, or for CSI-RS or SRS between other wireless devices. In this example, the base station generally provides MCSI-RS symbols to the UE according to a fixed sequence of transmission beams. For example, the base station may transmit M=4 CSI-RS symbols to the UE over a pre-configured sequence of transmission beams A, B, C, and D, respectively, in that order. Moreover, a UE capable of only performing one measurement per symbol may attempt to receive the modulated CSI-RS symbols over a sequence of reception beams X, Y, Z, and W, respectively, in that order, estimate the RSRPs of the CSI-RS, and report the measurement results to the base station. For example, as illustrated in FIG. 6, the UE may attempt to receive over reception beam X the first CSI-RS symbol carried over transmission beam A and measure one SNR for beam pair AX accordingly, the UE may next attempt to receive over reception beam Y the second CSI-RS symbol carried over transmission beam B and measure one SNR for beam pair BY accordingly, the UE may then attempt to receive over reception beam Z the third CSI-RS symbol carried over transmission beam C and measure one SNR for beam pair CZ accordingly, and the UE may finally attempt to receive over reception beam W the fourth CSI-RS symbol carried over transmission beam D and measure one SNR for beam pair DW accordingly. Afterwards, the UE may report the SNR measurement results to the base station, and the base station may then consider these measurement results when refining beams for subsequent transmissions over PDSCH or receptions over PUSCH.

However, here, since the sequence of transmission beams A-B-C-D is fixed (e.g., it may be a pre-configured sequence agreed upon between the base station and UE), and if the base station expects the UE to only perform one measurement per symbol, the base station does not convey any information to the UE regarding this sequence of transmission beams during transmission of the CSI-RS symbols 602.

In contrast, if the UE indicates to the base station that the UE is capable of performing multiple measurements per symbol (e.g., in a capability report), the base station may determine a different sequence of transmission beams and convey information regarding the determined sequence to the UE during transmission of the CSI-RS symbols.

FIGS. 7A and 7B illustrate examples 700, 750 of CSI-RS symbols 702, 752 that a base station may transmit to a UE when the UE is capable of performing four simultaneous RF measurements during a symbol length, assuming the UE has reported AX, BY, CZ, and DW as the best L distinguishable beam pairs as described above. While this example specifically refers to CSI-RS from a base station to a UE, similar principles may apply for SRS from a UE to a base station, or for CSI-RS or SRS between other wireless devices (e.g., side link or IAB devices). In example 700 of FIG. 7A, the base station may arbitrarily determine the sequence of transmission beams to be C-B-D-A. In such cases, since the UE is capable of performing four measurements per symbol, the base station may transmit M=4 CSI-RS symbols to the UE over transmission beams C, B, D, and A, respectively, in that order. Similarly, in example 750 of FIG. 7B, the base station may arbitrarily determine the sequence of transmission beams to be A-D-C-B. In such cases, since the UE is capable of performing four measurements per symbol, the base station may transmit M=4 CSI-RS symbols to the UE over transmission beams A, D, C, and B, respectively, in that order. In either example, the UE may attempt to receive each CSI-RS symbol 702, 752 simultaneously over reception beams X, Y, Z, and W, estimate multiple RSRPs for each CSI-RS symbol, and report measurement results accordingly. For instance, as illustrated in example 700, the UE may attempt to receive simultaneously over reception beams X, Y, Z, and W (using multiple RF chains or other capability described above) the first CSI-RS symbol carried over transmission beam C and measure four SNRs respectively for beam pairs CX, CY, CZ, CW accordingly, the UE may next attempt to receive simultaneously over reception beams X, Y, Z, and W the second CSI-RS symbol carried over transmission beam B and measure four SNRs for beam pairs BX, BY, BZ, BW accordingly, and so forth. Similarly, as illustrated in example 750, the UE may attempt to receive simultaneously over reception beams X, Y, Z, and W the first CSI-RS symbol carried over transmission beam A and measure four SNRs respectively for beam pairs AX, AY, AZ, AW accordingly, the UE may next attempt to receive simultaneously over reception beams X, Y, Z, and W the second CSI-RS symbol carried over transmission beam D and measure four SNRs for beam pairs DX, DY, DZ, DW accordingly, and so forth. Afterwards, the UE may report the SNR measurement results to the base station, and the base station may then consider these measurement results when refining beams for subsequent transmissions over PDSCH or receptions over PUSCH.

As described above, a transmitting device may determine a transmission beam sequence from the transmission beams in the distinguishable beam pairs. For instance, assuming the UE has reported AX, BY, CZ, and DW as distinguishable beam pairs, the base station may arbitrarily determine the permutation of transmission beams to be C-B-D-A as in example 700, the permutation of transmission beams to be A-D-C-B as in example 750, or some other permutation from the set of transmission beam candidates {A, B, C, D} in the distinguishable beam pairs. Thus, the determined sequence of transmission beams may depend on the number of transmission beam candidates L. Moreover, the number M of reference signal symbols that the transmitting device may send depends on the number of transmission beam candidates as well as the number of measurements per symbol which the UE is capable of performing. For instance, in the examples of FIGS. 7A and 7B, the base station may send M=4 CSI-RS symbols across four transmission beams A, B, C, D when the UE is capable of performing four RF measurements in each symbol, while in other examples with four transmission beams A, B, C, D, the number of CSI-RS symbols may increase to M=6 if the UE is capable of performing only two RF measurements in each symbol or even further to M=16 if the UE is capable of performing only one RF measurement in each symbol.

The transmitting device may impliedly convey information regarding the determined sequence of transmission beams, as described in more detail below with respect to FIGS. 8-11, over the number M of reference signal symbols. The achievable rate at which this information may be conveyed is in bits per channel use (bpcu) and may be defined, for example, by the following formula, where L represents a number of transmission beam candidates and M represents a number of reference signal symbols:

$$\begin{cases} \frac{1}{M}\log_2\left(\frac{L!}{L-M!}\right) \text{ if } L \geq M \\ \frac{1}{M}\log_2(L!) \text{ if } L < M \end{cases} \quad (1)$$

Similarly, the number of reception beams which the receiving device may search during beam refinement (i.e., the number of reception beams over which the UE or other receiving device performs SNR measurements) may depend on the number of transmission beam candidates L and the number M of reference signal symbols as defined, for example, by the following formula:

$$\begin{cases} \frac{L(L+1)}{2} - \frac{(L-M)(L-M+1)}{2} \text{ if } L \geq M \\ \frac{L(L+1)}{2} \text{ if } L < M \end{cases} \quad (2)$$

As the value of L increases, the achievable rate (in bpcu) and the number of reception beams to be searched can be approximated as $\log_2 L$ and LM, respectively.

Figure 8:
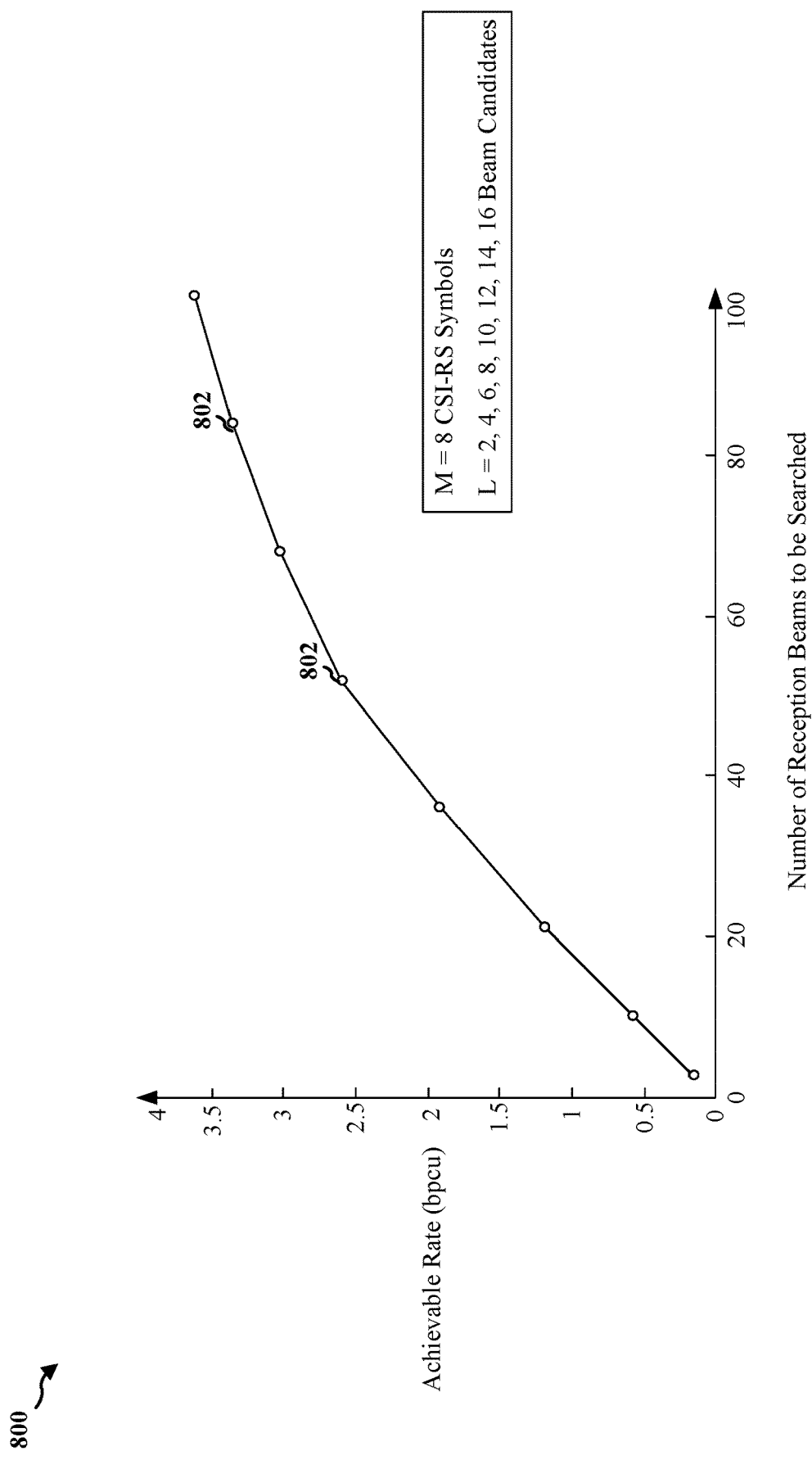
FIG. 8 is a diagram illustrating an example of a chart showing a relationship between a number of searched reception beams and a data rate for a given number of CSI-RS symbols and different numbers of beam candidates.

FIG. 8 illustrates an example 800 of a chart showing a relationship between the achievable rate and number of reception beams to be searched for different values of L=2, 4, 6, 8, 10, 12, 14, 16 when M=8. As can be seen in the chart, as the achievable rate increases (as more information regarding transmission beam sequences is conveyed) and as the number of transmission beam candidates 802 increases, the number of reception beams to be searched also increases in a linearly growing trend. Thus, a tradeoff may exist between search time (latency) and achievable rate.

For example, referring to FIGS. 7A and 7B, if a base station sends M=4 CSI-RS symbols respectively over L=4 transmission beams and if the UE is capable of performing four RF measurements during a symbol length, the achievable rate at which the base station conveys information regarding the transmission beam sequence (e.g. C-B-D-A or A-D-C-B) over the four CSI-RS symbols is 1.15 bpcu $$\left(\text{i.e., }\log_2 \frac{4!}{4}\right).$$

Alternatively, if the UE is only capable of performing two RF measurements during a symbol length, the base station sends M=6 CSI-RS symbols to allow the UE to perform measurements over all L=4 transmission beams, leading to an achievable rate of 0.76 bpcu $$\left(\text{i.e., } \log_2 \frac{4!}{6}\right).$$

Figure 9:
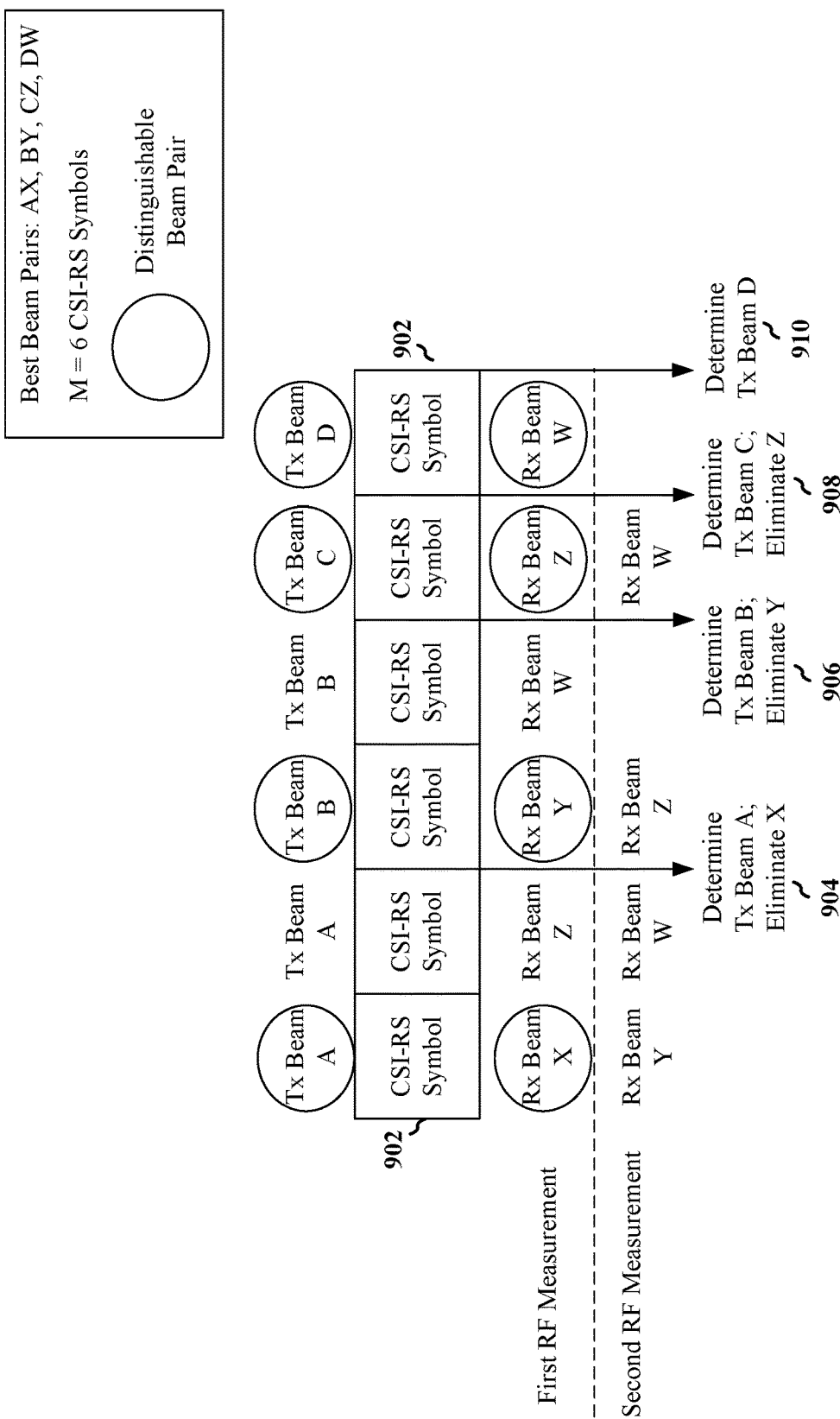
FIG. 9 is a diagram illustrating an example of CSI-RS symbols which the base station transmits according to a determined sequence of transmission beams, where during each symbol the UE performs two signal strength measurements over different reception beams.

This example is illustrated in FIG. 9 described below. In contrast, if the UE is only capable of performing one RF measurement during a symbol length, the base station sends M=16 CSI-RS symbols to allow the UE to perform measurements over all L=4 transmission beams, leading to an achievable rate of 0.29 bpcu $$\left(\text{i.e., } \log_2 \frac{4!}{16}\right).$$

Thus, in cases where a transmitting device does not change its transmission beam across RF chains during a symbol length, but where a reception device may perform two RF measurements (over two reception beams) per symbol, the receiving device may determine the transmission beam sequence at a faster rate (e.g., a faster rate of 0.76 bpcu) than if the receiving device is only capable of performing one RF measurement per symbol (e.g., a slower rate of 0.29 bpcu).

FIG. 9 illustrates an example 900 of CSI-RS symbols 902 that a base station may transmit to a UE over four transmission beams A, B, C, and D. The example illustrates how the base station may impliedly convey a transmission beam sequence to a UE capable of performing 2 RF measurements per CSI-RS symbol (i.e., measuring SNRs over two reception beams during a symbol length). While this example specifically refers to CSI-RS from a base station to a UE, similar principles may apply for SRS from a UE to a base station, or for CSI-RS or SRS between other wireless devices. For instance, the UE may similarly implicitly convey a transmission beam sequence to a base station capable of performing 2 RF measurements per SRS symbol.

In this example 900, based on the number of transmission beams and the RF measurement capability of the UE, the base station may determine to transmit M=6 CSI-RS symbols over various transmission beams in the following arbitrarily determined sequence: A-B-C-D. The base station may determine the sequence from the list of transmission beam candidates in the set of distinguished beam pairs AX, BY, CZ, and DW, which the base station has previously received from the UE. The UE may determine the transmission beam sequence as a result of its reception beam measurements as the UE receives the CSI-RS symbols 902. For example, the UE may determine the sequence of transmission beams in response to measuring SNRs over four reception beams X, Y, Z, and W. In this example, the SNRs associated with each transmission-reception beam pair (e.g., AX, AY, AZ, AW, BX, BY, BZ, BW, etc.) may match the SNRs illustrated in the example of FIG. 5.

In the illustrated example, the base station has determined the UE is capable of performing two RF measurements per symbol, e.g., in response to a capability report from the UE. Therefore, the base station may initially transmit the first two CSI-RS symbols over transmission beam A (the first beam in the sequence) for the UE to measure across all of its reception beams X, Y, Z, W. Thus, the UE may simultaneously measure SNRs over reception beams X and Y during the first CSI-RS symbol and over reception beams Z and W during the second CSI-RS symbol, although the UE may select different reception beams for each symbol in other examples. Here, the UE may determine that reception beam X is the best beam since it is associated with the highest SNR (e.g., as illustrated in FIG. 5), and the UE may compare reception beam X with the distinguishable beam pairs. Upon determining that X is paired with A in the set of distinguishable beam pairs, the UE may determine at 904 that the first and second CSI-RS symbols were transmitted over transmission beam A. Thus, the UE may determine that the transmission beam sequence begins with A. Additionally, as the base station does not transmit sequences with duplicate or missing transmission beams (e.g., A-A-C-D, A-B-C-B, D-C-B-D, etc.), the UE may determine that transmission beam A will not be used for the remaining CSI-RS symbols, and therefore the UE may eliminate reception beam X from its subsequent measurements.

Subsequently, the base station may transmit the next two CSI-RS symbols over transmission beam B (the second beam in the sequence) for the UE to measure across all its remaining reception beams Y, Z, W. Thus, in the illustrated example, the UE may simultaneously measure SNRs over reception beams Y and Z during the third CSI-RS symbol and over reception beam W during the fourth CSI-RS symbol. Alternatively, the UE may measure reception beams Y, Z, and W in a different order than illustrated across the third and fourth CSI-RS symbols. Here, the UE may determine that reception beam Y is the best beam since it is associated with the highest SNR (e.g., as illustrated in FIG. 5), and the UE may compare reception beam Y with the distinguishable beam pairs. Upon determining that Y is paired with B in the set of distinguishable beam pairs, the UE may determine at 906 that the third and fourth CSI-RS symbols were transmitted over transmission beam B. Thus, the UE may determine that the transmission beam sequence continues with B. Additionally, as the base station does not transmit sequences with duplicate or missing transmission beams, the UE may determine that transmission beam B will not be used for the remaining CSI-RS symbols, and therefore the UE may eliminate reception beam Y from its subsequent measurements.

Next, the base station may transmit a CSI-RS symbol over transmission beam C (the third beam in the sequence) for the UE to measure across its remaining reception beams Z and W. Thus, the UE may simultaneously measure SNRs over reception beams Z and W during the fifth CSI-RS symbol. Here, the UE may determine that reception beam Z is the best beam since it is associated with the highest SNR (e.g., as illustrated in FIG. 5), and the UE may compare reception beam Z with the distinguished beam pairs. Upon determining that Z is paired with C in the set of distinguished beam pairs, the UE may determine at 908 that the fifth CSI-RS symbol was transmitted over transmission beam C. Thus, the UE may determine that the transmission beam sequence continues with C. Additionally, as the base station does not transmit sequences with duplicate or missing transmission beams, the UE may determine that transmission beam C will not be used for the remaining CSI-RS symbol, and therefore the UE may eliminate reception beam Z from its subsequent measurements.

Finally, the base station may transmit a CSI-RS symbol over transmission beam D (the fourth beam in the sequence) for the UE to measure over its remaining reception beam W. Even though one reception beam remains, the UE may still measure SNR to determine beam link quality. Thus, the UE may measure the SNR over reception beam W during the sixth CSI-RS symbol to determine if W is still the best beam. The UE may then compare reception beam W with the distinguished beam pairs. Upon determining that W is paired with D in the set of distinguished beam pairs, the UE may determine at 910 that the sixth CSI-RS symbol was transmitted over transmission beam D. Thus, the UE may determine that the transmission beam sequence finishes with D, and therefore that the entire transmission beam sequence was A-B-C-D. In this way, through the UE's identification of reception beams that best receive each CSI-RS symbol as described above, the base station may impliedly convey the transmission beam sequence A-B-C-D to the UE.

In another example, the transmitting device (e.g., a base station, UE, or other wireless device) may group transmission beams into different beam groups. For example, the base station may arbitrarily group transmission beams A, B, C, D such that one group includes transmission beams A and D (Group 1={A, D}), and the other group includes transmission beams B and C (Group 2={B, C}). The transmitting device may group the transmission beams differently in other examples. After configuring the transmission beam groups, the transmitting device may provide the groupings to the receiving device (e.g., a UE, a base station, or other wireless device). For example, the base station may indicate to the UE that Group 1={A, D} and Group 2={B, C}. Subsequently, when the transmitting device determines a transmission beam sequence during beam management, the transmitting device first determines which group of transmission beams will be sent initially. For instance, the base station may randomly select to transmit beams initially in the first group {A, D} followed by the beams in the second group {B, C}. After selecting the group order, the transmitting device proceeds to select the beam order within each group to obtain the transmission beam sequence. For instance, in the first group, the base station may arbitrarily select transmission beam D followed by transmission beam A, and then in the second group, the base station may arbitrarily select transmission beam C followed by transmission beam B. Thus, in this example, the transmitting device may determine the sequence of transmission beams to be D-A-C-B based on randomly selected transmission beam groups.

Transmission beam grouping may result in more transmission beam candidates (a higher L) than in the example of FIG. 9. For instance, if the base station groups four transmission beams into two groups as described above, then when determining the transmission beam sequence, the base station may select between two groups, between two beams in the first group, and between two beams in the second group (L=8=2*2*2), rather than between four beams in one group as in the prior example (L=4). Moreover, the grouping may result in less number of CSI-RS symbols (a lower M) than in the example of FIG. 9. For instance, if the base station groups four transmission beams into two groups and the UE is capable of performing two RF measurements per symbol, the base station may transmit M=5 CSI-RS symbols (rather than M=6 CSI-RS symbols as in the prior example) since the UE may be able to eliminate certain reception beams for CSI-RS symbols corresponding to different transmission beam groups. This example can be seen as described below with respect to FIG. 10. Thus, transmission beam grouping in this example (where L=8 and M=5) may lead to an achievable rate of 0.6 bpcu $$\left(\text{i.e., }\log_2 \frac{8!}{5}\right).$$

Although transmission beam grouping may accordingly lead to smaller rates than may be achieved without such grouping (e.g., 0.6 bpcu is smaller than the achievable rate of 0.76 bpcu in the prior example of FIG. 9), such grouping may allow the UE to perform more uniform RF measurements across all CSI-RS symbols. For instance, with transmission beam grouping, the UE may uniformly perform two SNR measurements during all five CSI-RS symbols to identify the transmission beam sequence, rather than non-uniformly perform one or two SNR measurements during each CSI-RS symbol as illustrated in the example of FIG. 9.

Figure 10:
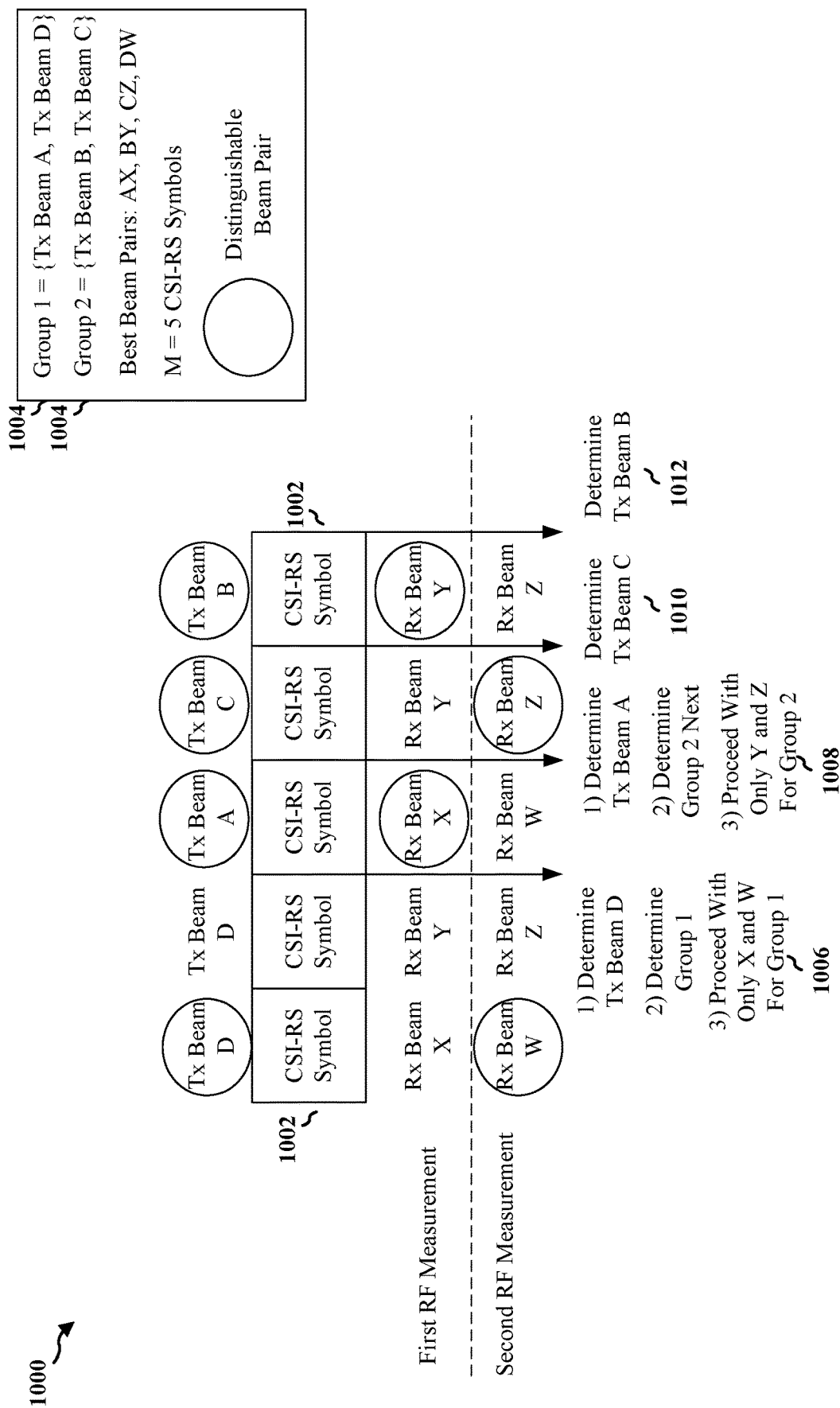
FIG. 10 is a diagram illustrating an example of CSI-RS symbols which the base station transmits according to a determined sequence of transmission beams in different transmission beam groups, where during each symbol the UE performs two signal strength measurements over different reception beams.

FIG. 10 illustrates an example 1000 of CSI-RS symbols 1002 that a base station may transmit to a UE over four transmission beams A, B, C, and D in different transmission beam groups 1004. The example illustrates how the base station may impliedly convey a transmission beam sequence to a UE capable of performing 2 RF measurements per CSI-RS symbol (i.e., measuring SNRs over two reception beams during a symbol length) when the transmission beams in the sequence are in different transmission beam groups. While this example specifically refers to CSI-RS from a base station to a UE, similar principles may apply for SRS from a UE to a base station, or for CSI-RS or SRS between other wireless devices. For instance, the UE may similarly impliedly convey a transmission beam sequence to a base station capable of performing 2 RF measurements per SRS symbol when the transmission beams in the sequence are in different transmission beam groups.

In example 1000, based on the number of transmission beams and the RF measurement capability of the UE, the base station may determine to transmit M=5 CSI-RS symbols over various transmission beams in the following arbitrarily determined sequence: D-A-C-B. The base station may determine the sequence (e.g., the group order and beam order within each group) from the list of transmission beam candidates in the set of distinguished beam pairs AX, BY, CZ, and DW, which the base station has previously received from the UE. The UE may determine the transmission beam sequence as a result of its reception beam measurements as the UE receives the CSI-RS symbols 1002. For example, the UE may determine the sequence of transmission beams in response to measuring SNRs over four reception beams X, Y, Z, and W. In this example, the SNRs associated with each transmission-reception beam pair (e.g., AX, AY, AZ, AW, BX, BY, BZ, BW, etc.) may match the SNRs illustrated in the example of FIG. 5.

In the illustrated example, the base station has determined the UE is capable of performing two RF measurements per symbol, e.g., in response to a capability report from the UE. Therefore, the base station may initially transmit the first two CSI-RS symbols over transmission beam D (the first beam in the sequence and the initial beam in Group 1) for the UE to measure across all of its reception beams X, Y, Z, W. Thus, the UE may simultaneously measure SNRs over reception beams X and W during the first CSI-RS symbol and over reception beams Y and Z during the second CSI-RS symbol, although the UE may select different reception beams for each symbol in other examples. Here, the UE may determine that reception beam W is the best beam since it is associated with the highest SNR (e.g., as illustrated in FIG. 5), and the UE may compare reception beam W with the distinguishable beam pairs. Upon determining that W is paired with D in the set of distinguishable beam pairs, the UE may determine at 1006 that the first and second CSI-RS symbols were transmitted over transmission beam D. Thus, the UE may determine that the transmission beam sequence begins with D, and therefore that the base station has selected to initially proceed with Group 1={A, D}. Additionally, as the base station transmits over all transmission beams in a selected group before moving on to the next group, the UE may eliminate paired reception beams outside of the selected group for its subsequent measurement(s). For example, upon determining the base station has selected Group 1={A, D}, the UE may determine that transmission beams B and C will not be used for the next CSI-RS symbol since those beams are not in Group 1. Therefore the UE may only proceed with paired reception beams X and W in its subsequent measurement, since those beams are paired with the Group 1 beams in the set of distinguishable beam pairs.

Subsequently, the base station may transmit the next CSI-RS symbol over transmission beam A (the second beam in the sequence and the next beam in Group 1) for the UE to measure across reception beams X and W. Even though the UE may ascertain the transmission beam is A at this time, the UE may still measure the SNRs of X and W to determine beam link quality. Thus, in the illustrated example, the UE may simultaneously measure SNRs over reception beams X and W during the second CSI-RS symbol. Here, the UE may determine that reception beam X is the best beam since it is associated with the highest SNR (e.g., as illustrated in FIG. 5), and the UE may compare reception beam X with the distinguishable beam pairs. Upon determining that X is paired with A in the set of distinguishable beam pairs, the UE may determine at 1008 that the second CSI-RS symbol was transmitted over transmission beam A. Thus, the UE may determine that the transmission beam sequence continues with A. Additionally, as the base station has transmitted over all transmission beams in Group 1, the UE may determine that the base station will proceed with the transmission beams in Group 2, and therefore the UE may eliminate paired reception beams in Group 1 for its subsequent measurements. For example, the UE may determine that transmission beams B and C will now be used for the next CSI-RS symbols since those beams are in Group 2. Therefore the UE may only proceed with paired reception beams Y and Z in its subsequent measurement, since those beams are paired with the Group 2 beams in the set of distinguishable beam pairs.

Next, the base station may transmit a CSI-RS symbol over transmission beam C (the third beam in the sequence and the initial beam in Group 2) for the UE to measure across reception beams Y and Z. Thus, the UE may simultaneously measure SNRs over reception beams Y and Z during the fourth CSI-RS symbol. Here, the UE may determine that reception beam Z is the best beam since it is associated with the highest SNR (e.g., as illustrated in FIG. 5), and the UE may compare reception beam Z with the distinguishable beam pairs. Upon determining that Z is paired with C in the set of distinguishable beam pairs, the UE may determine at 1010 that the fourth CSI-RS symbol was transmitted over transmission beam C. Thus, the UE may determine that the transmission beam sequence continues with C. Additionally, as the base station transmits over all transmission beams in a selected group, the UE may continue to measure over paired reception beams in the selected group for its subsequent measurement(s). For example, upon determining the base station has selected Group 2 {B, C}, the UE may determine that transmission beams A and D will not be used for the next CSI-RS symbol since those beams are not in Group 2. Therefore, the UE may continue to measure with paired reception beams Y and Z in its subsequent measurement, since those beams are paired with the Group 2 beams in the set of distinguishable beam pairs.

Finally, the base station may transmit a CSI-RS symbol over transmission beam B (the fourth beam in the sequence and the next beam in Group 2) for the UE to measure across reception beams Y and Z. Even though the UE may ascertain the transmission beam is B at this time, the UE may still measure the SNRs of Y and Z to determine beam link quality. Thus, the UE may simultaneously measure SNRs over reception beams Y and Z during the fifth CSI-RS symbol. Here, the UE may determine that reception beam Y is the best beam since it is associated with the highest SNR (e.g., as illustrated in FIG. 5), and the UE may compare reception beam Y with the distinguished beam pairs. Upon determining that Y is paired with B in the set of distinguished beam pairs, the UE may determine at 1012 that the fifth CSI-RS symbol was transmitted over transmission beam B. Thus, the UE may determine that the transmission beam sequence finishes with B, and therefore that the entire transmission beam sequence was D-A-C-B. In this way, through the UE's identification of reception beams that best receive each CSI-RS symbol as described above, the base station may impliedly convey the transmission beam sequence D-A-C-B to the UE.

Furthermore, in some cases, the best beam pairs that the UE and base station may identify during beam training may include transmission beams which are not associated with distinguishable reception beams. For example, assume that during beam training, the UE identifies and reports the best K beam pairs as AX, BX, CZ, and DW. Here, transmission beams A and B are both associated with the same reception beam X, and therefore X is not a distinguishable reception beam. This concept of distinguishable reception beams is different than the concept of distinguishable beam pairs as described above with respect to FIG. 5. For example, even though AX may not include a distinguishable reception beam, AX may still be a distinguishable beam pair if the difference between its SNR and the maximum SNR of AY, AZ, and AW meets a signal strength threshold.

In such case of distinguishable reception beams, when the transmitting device (e.g., the base station, the UE, or other wireless device) performs transmission beam grouping of transmission beams as described above, the transmitting device may group the transmission beams such that transmission beams associated with indistinguishable reception beams are placed in different groups. For example, the base station may select the groups such that Group 1={A, D} and Group 2={B, C}, similar to that described above in the example of FIG. 10, to ensure that transmission beams A and B are in different transmission beam groups and thus are pairwise distinguishable within each group. The transmitting device may then arbitrarily determine the transmission beam sequence based on transmission beam groups as described above, e.g., by randomly selecting the group order followed by the beam order for each group. Thus, similar to the example of FIG. 10, here L=8 since there again may be eight different possibilities of beam combinations, namely two between Group 1 and Group 2, two between the beams in Group 1, and two between the beams in Group 2. However, unlike the example of FIG. 10 where the base station may transmit M=5 CSI-RS symbols, in this example the presence of indistinguishable reception beams may cause the base station to transmit M=6 CSI-RS symbols to allow the UE to determine the transmission beam sequence. Thus, indistinguishable reception beams in transmission beam groups may lead to a smaller achievable rate of 0.5 bpcu $$\left(\text{i.e., } \log_2 \frac{8!}{6}\right)$$

than in the prior example of FIG. 10.

Figure 11:
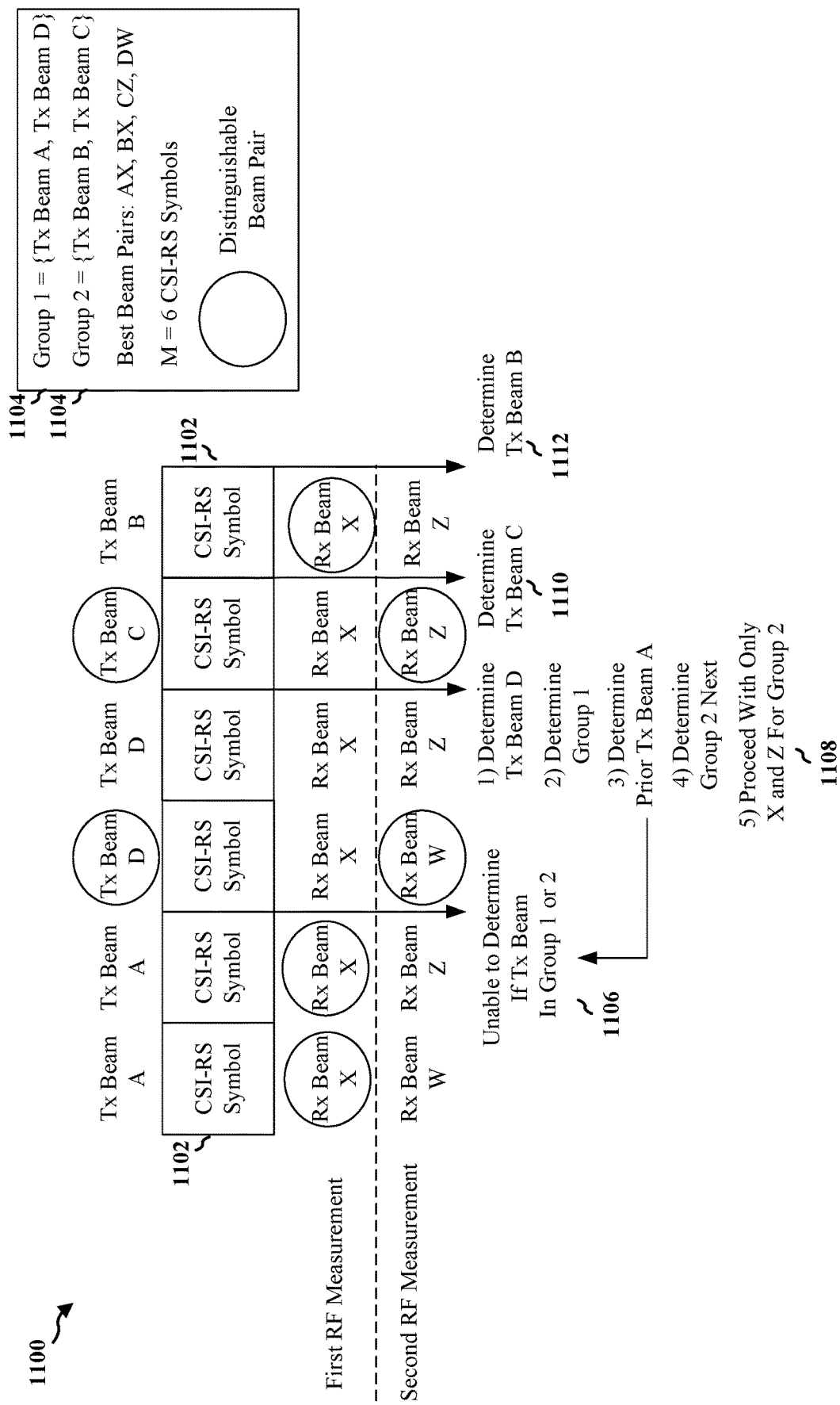
FIG. 11 is a diagram illustrating another example of CSI-RS symbols which the base station transmits according to a determined sequence of transmission beams in different transmission beam groups, where during each symbol the UE performs two signal strength measurements over different reception beams.

FIG. 11 illustrates an example 1100 of CSI-RS symbols 1102 that a base station may transmit to a UE over four transmission beams A, B, C, and D in different transmission beam groups 1104, where transmission beams associated with indistinguishable reception beams are separated among the groups. The example illustrates how the base station may impliedly convey a transmission beam sequence to a UE capable of performing 2 RF measurements per CSI-RS symbol (i.e., measuring SNRs over two reception beams during a symbol length) when the transmission beams in the sequence are in different transmission beam groups and associated with indistinguishable reception beams. While this example specifically refers to CSI-RS from a base station to a UE, similar principles may apply for SRS from a UE to a base station, or for CSI-RS or SRS between other wireless devices. For instance, the UE may similarly impliedly convey a transmission beam sequence to a base station capable of performing 2 RF measurements per SRS symbol when the transmission beams in the sequence are in different transmission beam groups and associated with indistinguishable reception beams.

In example 1100, based on the number of transmission beams and the RF measurement capability of the UE, the base station may determine to transmit M=6 CSI-RS symbols over various transmission beams in the following arbitrarily determined sequence: A-D-C-B. The base station may determine the sequence (e.g., the group order and beam order within each group) from the list of transmission beam candidates in the set of distinguished beam pairs AX, BX, CZ, and DW, which the base station has previously received from the UE. The UE may determine the transmission beam sequence as a result of its reception beam measurements as the UE receives the CSI-RS symbols 1102. For example, the UE may determine the sequence of transmission beams in response to measuring SNRs over three reception beams X, Z, and W. In this example, the SNRs associated with each transmission-reception beam pair (e.g., AX, AZ, AW, BX, BZ, BW, etc.) may match the SNRs illustrated in the example of FIG. 5.

In the illustrated example, the base station has determined the UE is capable of performing two RF measurements per symbol, e.g., in response to a capability report from the UE. Therefore, the base station may initially transmit the first two CSI-RS symbols over transmission beam A (the first beam in the sequence and the initial beam in Group 1) for the UE to measure across all of its reception beams X, Z, W. Thus, the UE may simultaneously measure SNRs over reception beams X and W during the first CSI-RS symbol and over reception beams X and Z during the second CSI-RS symbol, although the UE may select different reception beams for each symbol in other examples. Here, the UE may determine that reception beam X is the best beam since it is associated with the highest SNR (e.g., as illustrated in FIG. 5), and the UE may compare reception beam X with the distinguishable beam pairs. Upon determining that X is paired with both A and B in the set of distinguishable beam pairs, the UE may be unable to determine at 1106 whether the first and second CSI-RS symbols were transmitted over transmission beam A or over transmission beam B, since both beams are in different transmission beam groups and the UE has not yet identified which group was initially selected by the base station. Thus, the UE will proceed to measure the next CSI-RS symbols again over reception beams X, W and Z.

Subsequently, the base station may transmit the next two CSI-RS symbols over transmission beam D (the second beam in the sequence and the next beam in Group 1) for the UE to measure across all of its reception beams X, Z and W. Thus, in the illustrated example, the UE may simultaneously measure SNRs over reception beams X and W during the third CSI-RS symbol and over reception beams X and Z during the fourth CSI-RS symbol, although the UE may select different reception beams for each symbol in other examples. Here, the UE may determine that reception beam W is the best beam since it is associated with the highest SNR (e.g., as illustrated in FIG. 5), and the UE may compare reception beam W with the distinguishable beam pairs. Upon determining that W is paired with D in the set of distinguishable beam pairs, the UE may determine at 1108 that the third and fourth CSI-RS symbols were transmitted over transmission beam D. Additionally, the UE may determine that since the base station transmits over all transmission beams in a group before moving on to the next group, the UE may ascertain that the first and second CSI-RS symbols were transmitted over transmission beam A (since Group 1={A, D}). Thus, the UE may determine that the transmission beam sequence starts with A-D. Additionally, as the base station has transmitted over all transmission beams in Group 1, the UE may determine that the base station will proceed with the transmission beams in Group 2, and therefore the UE may eliminate paired reception beams in Group 1 for its subsequent measurements. For example, the UE may determine that transmission beams B and C will now be used for the next CSI-RS symbols since those beams are in Group 2. Therefore the UE may only proceed with paired reception beams X and Z in its subsequent measurements, since those beams are paired with the Group 2 beams in the set of distinguishable beam pairs.

Next, the base station may transmit a CSI-RS symbol over transmission beam C (the third beam in the sequence and the initial beam in Group 2) for the UE to measure across reception beams X and Z. Thus, the UE may simultaneously measure SNRs over reception beams X and Z during the fifth CSI-RS symbol. Here, the UE may determine that reception beam Z is the best beam since it is associated with the highest SNR (e.g., as illustrated in FIG. 5), and the UE may compare reception beam Z with the distinguishable beam pairs. Upon determining that Z is paired with C in the set of distinguishable beam pairs, the UE may determine at 1110 that the fifth CSI-RS symbol was transmitted over transmission beam C. Thus, the UE may determine that the transmission beam sequence continues with C. Additionally, as the base station transmits over all transmission beams in a selected group, the UE may continue to measure over paired reception beams in the selected group for its subsequent measurement(s). For example, upon determining the base station has selected Group 2 {B, C}, the UE may determine that transmission beams A and D will not be used for the next CSI-RS symbol since those beams are not in Group 2. Therefore the UE may continue to measure with paired reception beams X and Z in its subsequent measurement, since those beams are paired with the Group 2 beams in the set of distinguishable beam pairs.

Finally, the base station may transmit a CSI-RS symbol over transmission beam B (the fourth beam in the sequence and the next beam in Group 2) for the UE to measure across reception beams X and Z. Even though the UE may ascertain the transmission beam is B at this time, the UE may still measure the SNRs of X and Z to determine beam link quality. Thus, the UE may simultaneously measure SNRs over reception beams X and Z during the sixth CSI-RS symbol. Here, the UE may determine that reception beam X is the best beam since it is associated with the highest SNR (e.g., as illustrated in FIG. 5), and the UE may compare reception beam X with the distinguished beam pairs. Upon determining that X is paired with A and B in the set of distinguished beam pairs and that the current group is Group 2 {B, C}, the UE may determine at 1112 that the sixth CSI-RS symbol was transmitted over transmission beam B. Thus, the UE may determine that the transmission beam sequence finishes with B, and therefore that the entire transmission beam sequence was A-D-C-B. In this way, through the UE's identification of reception beams that best receive each CSI-RS symbol as described above, the base station may impliedly convey the transmission beam sequence A-D-C-B to the UE.

The base station may determine whether to impliedly convey a determined transmission beam sequence (such as described above with respect to FIGS. 9-11), or whether to merely transmit CSI-RS symbols according to a fixed transmission beam sequence without conveying information regarding the sequence (such as described above with respect to FIG. 6), in response to a capability information message from the UE. The capability information message may indicate whether the UE has hardware capability to perform multiple, simultaneous RF measurements during a symbol length, or the number of possible measurements the UE may perform during a symbol length or other defined period of time. In response to the capability information message, the base station may determine the number M of CSI-RS symbols to transmit according to its determined transmission beam sequence as previously described.

Moreover, the base station as transmitting device and UE as receiving device (or vice-versa) may determine the sequence of transmission beams based on the distinguishable beam pair set as described above. For instance, the base station may identify candidates to select for its transmission beam sequence from the distinguishable beam pair set, and the UE may determine the sequence of transmission beams selected by the base station in response to identifying the best reception beams from the distinguishable beam pair set. As described above, the UE may determine the distinguishable beam pairs based on a signal strength threshold configured by the base station, and the UE may identify distinguishable beam pairs in response to searching for the best reception beams over multiple RF measurements per CSI-RS symbol carried over each associated transmission beam. Moreover, since distinguishable beam pairs may change with channel conditions (e.g., in response to user mobility, change in channel environment, blockage conditions, etc.), the UE may constantly update and report the set of distinguishable beam pairs.

Additionally, the base station as transmitting device may inform the UE as receiving device (or vice-versa) whether any groups of transmission beams are present, including the number of transmission beam groups and the transmission beams which constitute each group. If the UE indicates to the base station that any of the transmission beams are associated with indistinguishable reception beams (e.g., in the set of distinguishable beam pairs), the base station may group the transmission beams accordingly as described above with respect to FIG. 11.

While the examples described above with respect to FIGS. 6, 7A-7B, and 9-11 all refer to a base station determining a sequence of transmission beams, the base station sending CSI-RS symbols over each transmission beam to the UE, the UE performing multiple RF measurements during each CSI-RS symbol to identify the best reception beams, and the UE subsequently determining the transmission beam sequence which the base station impliedly conveys, the examples are not so limited. For example, the roles of the base station and UE may be reversed, in which case the UE may arbitrarily determine a sequence of transmission beams, the UE may send SRS symbols over each transmission beam to the UE, the base station may perform multiple RF measurements (e.g., based on multiple RF chains or other aforementioned capability) during each SRS symbol to identify the best reception beams, and the base station may subsequently determine the transmission beam sequence which the UE impliedly conveys. Thus, the transmitting device and receiving device described above throughout this disclosure are not limited to a base station and a UE, respectively, but may include other devices. For example, either the transmitting device or receiving device may be a base station, a TRP, a repeater, an IAB node, a UE, a relay or sidelink node, or a CPE.

Figure 12:
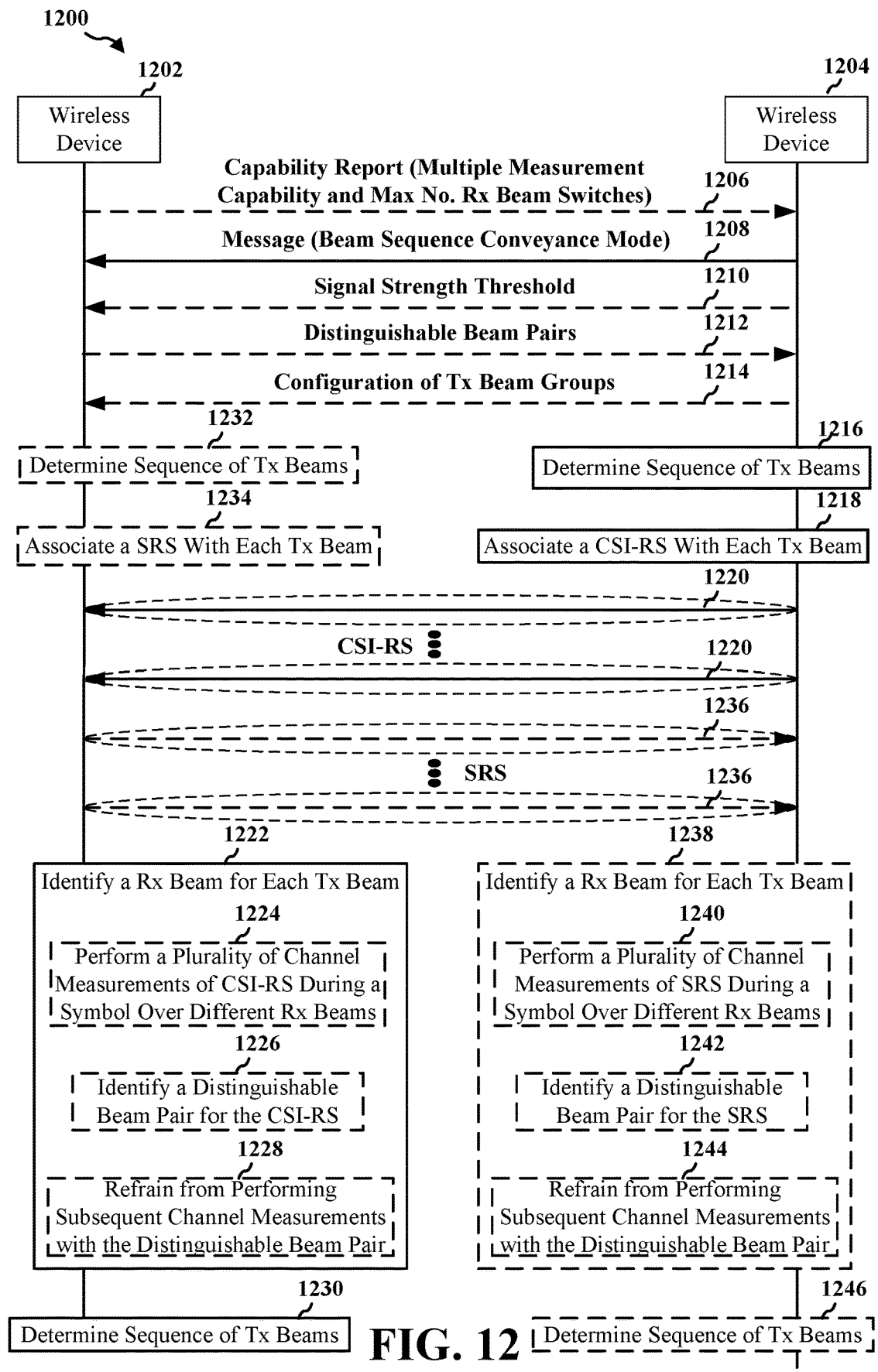
FIG. 12 is a diagram illustrating a call flow between wireless devices.

FIG. 12 is an example 1200 of a call flow between a wireless device 1202 and a wireless device 1204. Wireless device 1202 may be, for example, a UE, a relay or sidelink node, a CPE, a repeater, or an IAB node, which includes multiple antennas that may transmit or receive data over any given carrier frequency. Wireless device 1204 may be, for example, a base station, a TRP, a UE, a relay or sidelink node, a CPE, a repeater, or an IAB node, which includes multiple antennas that may transmit or receive data over any given carrier frequency. For clarity of explanation, the following example description refers to wireless device 1202 as a UE and wireless device 1204 as a base station, although the wireless devices 1202, 1204 may be different devices in other examples.

The UE initially provides a capability report 1206 to the base station (e.g., in response to a capability inquiry message from the base station). In one example, the capability report 1206 may indicate a capability of the UE to perform multiple RF measurements during a symbol length. For example, the capability report may include a bit or other flag indicating whether the UE may perform two or more measurements (or reception beam switches) during a CSI-RS symbol. The capability report 1206 may alternatively (or additionally) indicate a number of measurements which the UE may perform during a CSI-RS symbol. For example, the UE may indicate to the base station that the UE may perform two, four, or other number of measurements (or reception beam switches) during a CSI-RS symbol such as described above with respect to FIGS. 7A-7B and 9-11. The capability report 1206 may alternatively (or additionally) indicate a maximum number of reception beam switches the UE may perform in a defined (e.g., a preconfigured) time period. For example, the UE may indicate to the base station that the UE may perform ten measurements in total over a preconfigured time period of six symbols, such as illustrated in FIG. 9, or over five symbols, such as illustrated in FIG. 10.

In response to the capability report 1206, the base station may provide a message 1208 indicating a beam sequence conveyance mode. The beam sequence conveyance mode may indicate to the UE whether the base station will impliedly convey an arbitrarily determined sequence of transmission beams during beam management, such as described above with respect to FIGS. 9-11, or whether the base station will merely transmit CSI-RS symbols according to a fixed transmission beam sequence during beam management (e.g., a pre-configured sequence previously agreed between the base station and UE or some other fixed sequence), such as described above with respect to FIG. 6. For example, the beam sequence conveyance mode may be in the form of a bit or flag which value indicates to the UE whether the base station will arbitrarily determine a transmission beam sequence for beam management, or whether the base station will perform conventional beam management procedures according to a fixed sequence of transmission beams. The base station may select the value or otherwise change to the beam sequence conveyance mode in response to determining from the capability report 1206 that the UE is capable of performing multiple RF measurements during a symbol length.

The base station may also provide a signal strength threshold 1210 (e.g., $SNR_{threshold}$) to the UE, and the UE may determine and provide a set of distinguishable beam pairs 1212 to the base station based on the signal strength threshold. For example, as described above with respect to FIG. 5, after the base station has transmitted SSBs across four transmission beams A, B, C, D, and the UE has received each SSB over four reception beams X, Y, Z, W, the UE may measure the SNRs 504 of sixteen beam pairs AX, AY, AZ, AW, BX, BY, BZ, BW, CX, CY, CZ, CW, DX, DY, DZ, DW and determine that AX, BY, CZ, and DW are the K best beam pairs respectively for each transmission beam. If the UE determines the $SNR_{threshold}$=7 dB, the UE may also determine that all of these best beam pairs are distinguishable beam pairs, since the difference between the SNR of AX and the maximum SNR of (AY, AZ, AW), the difference between the SNR of BY and the maximum SNR of (BX, BZ, BW), the difference between the SNR of CZ and the maximum SNR of (CX, CY, CW), and the difference between the SNR of DW and the maximum SNR of (DX, DY, DZ), are all equal to or larger than $SNR_{threshold}$. Thus, the UE may report to the base station beam pairs AX, BY, CZ, and DW as distinguishable beam pairs 1212 in response to receiving the signal strength threshold 1210 (e.g., 7 dB). Alternatively, the signal strength threshold 1210 may be a pre-configured threshold determinable by the UE without being provided expressly by the base station.

The base station may further provide a configuration 1214 of transmission beam groups to the UE. For example, as described above with respect to FIGS. 10 and 11, the base station may arbitrarily group transmission beams A, B, C, and D into two groups such that Group 1={A, D} and Group 2={B, C}, and the base station may indicate this grouping to the UE in the configuration. The configuration 1214 may indicate to the UE whether any groups of transmission beams are present, including the number of transmission beam groups and the transmission beams which constitute each group. Moreover, if the UE indicates to the base station that any of the transmission beams are associated with indistinguishable reception beams (e.g., the base station identifies common reception beams in the set of distinguishable beam pairs 1212), the base station may separately group these transmission beams such as described above with respect to FIG. 11.

At 1216, the base station may determine a sequence of transmission beams. For example, the base station may determine the sequence of transmission beams from the transmission beams indicated in the distinguished beam pairs 1212. For instance, the base station may arbitrarily determine a transmission beam sequence from one of multiple permutations or combinations of transmission beam candidates identified in the distinguished beam pairs of FIG. 5 (e.g., transmission beams A, B, C, D), such as one of the sequences illustrated and described above with respect to FIGS. 7A-7B and 9-11 (e.g., C-B-D-A, A-D-C-B, A-B-C-D, D-A-C-B, etc.). Moreover, when transmission beam groups are configured (e.g., in configuration 1214), the base station may also determine a group order and a beam order within each group when determining the sequence of transmission beams. For example, as described above with respect to FIGS. 10 and 11, the base station may determine the transmission beam sequence as a result of randomly selecting Group 1 or Group 2, the beam order in the randomly selected group, and then the beam order in the remaining group.

Afterwards, at 1218, the base station associates a CSI-RS 1220 with each transmission beam in the determined sequence at 1216. For example, as illustrated and described above with respect to FIGS. 7A-7B and 9-11, the base station may configure CSI-RS symbols 702, 752, 902, 1002, 1102 for transmission over the various transmission beams in the determined transmission beam sequence. The number of CSI-RS symbols M may depend on the number of transmission beam candidates in the distinguished beam pairs 1212, the configuration 1214 of transmission beam groups if present, and the presence if any of indistinguishable reception beams in the distinguished beam pairs. The base station may then send the CSI-RS 1220 to the UEs over the transmission beams in the determined sequence. For example, the base station may send the CSI-RS to the UE over associated transmission beams for the UE to measure during beam management.

At 1222, the UE may identify a reception beam for each transmission beam carrying the CSI-RS 1220. For example, as illustrated and described above with respect to FIGS. 9-11, the UE may identify a best reception beam (e.g., a reception beam associated with the highest SNR) for receiving each CSI-RS over the transmission beams. In one example, at 1224, the UE may perform a plurality of channel measurements of CSI-RS during a symbol over different reception beams. For instance, as illustrated and described above with respect to FIG. 9, the UE may simultaneously measure the SNRs over reception beams X and Y during the first CSI-RS symbol carried over transmission beam A, as well as the SNRs over reception beam Z and W during the second CSI-RS symbol also carried over transmission beam A. In such case, the UE may determine that reception beam X is associated with the highest SNR. Thus, the UE may identify reception beam X for the initial transmission beams carrying the CSI-RS. Then, at 1226, the UE may identify a distinguishable beam pair for the CSI-RS. For instance, as illustrated and described above with respect to FIGS. 5 and 9, the UE may check the set of distinguishable beam pairs (e.g., distinguishable beam pairs 1212) and determine that reception beam X is paired with transmission beam A. As a result, the UE may determine that the first and second CSI-RS symbols were transmitted over transmission beam A, and thus that the transmission beam sequence determined at 1216 begins with transmission beam A. Furthermore, at 1228, the UE may refrain from performing subsequent channel measurements with the distinguishable beam pair. For instance, as illustrated and described above with respect to FIG. 9, the UE may determine that transmission beam A will not be used for the remaining CSI-RS symbols since the base station does not transmit sequences with duplicate or missing transmission beams, and so the UE may eliminate reception beam X from its subsequent measurements. As a result, when the base station transmits the next two CSI-RS symbols over transmission beam B, the UE may only measure SNRs over reception beams Y, Z, and W (and not X). The UE may then repeat the aforementioned process over the remaining CSI-RS symbols, such as illustrated and described above with respect to FIG. 9, to identify the other reception beams, including reception beam Y for the third and fourth CSI-RS symbols carried over transmission beam B, reception beam Z for the fifth CSI-RS symbol carried over transmission beam C, and reception beam W for the sixth CSI-RS symbol carried over transmission beam D. In this way, the UE may identify the reception beams X, Y, Z, and W for each of the transmission beams A, B, C, and D in the base station determined sequence.

As a result, at 1230, the UE may determine the sequence of transmission beams which the base station determined at 1216. For example, as illustrated and described above with respect to FIG. 9, in response to identifying reception beam X for the first and second CSI-RS symbols, the UE may determine that the transmission beam sequence begins with A. Next, in response to identifying reception beam Y for the third and fourth CSI-RS symbols, the UE may determine that the transmission beam sequence continues with B. Subsequently, in response to identifying reception beam Z for the fifth CSI-RS symbol, the UE may determine that the transmission beam sequence continues with C. Finally, in response to identifying reception beam W for the sixth CSI-RS symbol, the UE may determine that the transmission beam sequence ends with D. Therefore, the UE may determine the transmission beam sequence to be A-B-C-D (in the example of FIG. 9) in response to identifying the reception beams for each transmission beam at 1222.

The UE may similarly identify reception beams for each transmission beam at 1222 and determine the sequence of transmission beams at 1230 based on the configuration 1214 of transmission beam groups. For example, as illustrated and described above with respect to FIG. 10, the UE may simultaneously measure SNRs over reception beams X and W during the first CSI-RS symbol and simultaneously measure SNRs over reception beams Y and Z during the second CSI-RS symbol, and determine that reception beam W is associated with the highest SNR. Thus, the UE may identify reception beam W for the initial transmission beams carrying the CSI-RS, determine that the first and second CSI-RS symbols were accordingly carried over transmission beam D, and infer from the determined transmission beam D that the base station has initially selected Group 1={A, D}. In response to determining that Group 1 was selected by the base station, the UE may perform multiple SNR measurements during the third CSI-RS symbol and identify reception beam X for the next transmission beam A, since A and D are in the same transmission beam group. The UE may then perform multiple SNR measurements during the fourth CSI-RS symbol and identify reception beam Z for the next transmission beam C, and similarly reception beam Y for the last transmission beam B, while eliminating reception beams X and W during these SNR measurements based on the determination that Group 2={B, C} is now selected. As a result, the UE may determine the sequence of transmission beams to be D-A-C-B in the example of FIG. 10.

In another example, if any indistinguishable reception beams are present in the distinguishable beam pairs 1212, the base station may separate associated transmission beams into different groups in the configuration 1214. Based on the configuration 1214 of transmission beam groups, the UE may similarly identify reception beams for each transmission beam at 1222 and determine the sequence of transmission beams at 1230. For instance, as illustrated and described above with respect to FIG. 11, the UE may identify reception beam X for the first two CSI-RS symbols carried over transmission beam A, reception beam W for the next two CSI-RS symbols carried over transmission beam D, and reception beams Z and X for the final two CSI-RS symbols carried over transmission beams C and B respectively. Moreover, the UE may determine the sequence of transmission beams to be A-D-C-B in this example of FIG. 11.

In an alternative example referring to SRS rather than CSI-RS, the roles of the UE and base station described above may be reversed. For instance, at 1232, the UE may determine a sequence of transmission beams. For example, the UE may determine the sequence of transmission beams from the transmission beams indicated in the distinguished beam pairs 1212. For instance, the UE may arbitrarily determine a transmission beam sequence from one of multiple permutations or combinations of transmission beam candidates identified in the distinguished beam pairs of FIG. 5 (e.g., transmission beams A, B, C, D), such as one of the sequences illustrated and described above with respect to FIGS. 7A-7B and 9-11 (e.g., C-B-D-A, A-D-C-B, A-B-C-D, D-A-C-B, etc.). Moreover, when transmission beam groups are configured (e.g., in configuration 1214), the UE may also determine a group order and a beam order within each group when determining the sequence of transmission beams. For example, similar to that described above with respect to FIGS. 10 and 11, the UE may determine the transmission beam sequence as a result of randomly selecting Group 1 or Group 2, the beam order in the randomly selected group, and then the beam order in the remaining group.

Afterwards, at 1234, the UE associates a SRS 1236 with each transmission beam in the determined sequence at 1232. For example, similar to that illustrated and described above with respect to FIGS. 7A-7B and 9-11, the UE may configure SRS symbols for transmission over the various transmission beams in the determined transmission beam sequence (similar to CSI-RS symbols 702, 752, 902, 1002, 1102). The number of SRS symbols M may depend on the number of transmission beam candidates in the distinguished beam pairs 1212, the configuration 1214 of transmission beam groups if present, and the presence if any of indistinguishable reception beams in the distinguished beam pairs. The UE may then send the SRS 1236 to the base station over the transmission beams in the determined sequence. For example, the UE may send the SRS to the base station for the base station to measure during beam management.

At 1238, the base station may identify a reception beam for each transmission beam carrying the SRS 1236. For example, similar to that illustrated and described above with respect to FIGS. 9-11, the base station may identify a best reception beam (e.g., a reception beam associated with the highest SNR) for receiving each SRS over the transmission beams. In one example, at 1240, the base station may perform a plurality of channel measurements of SRS during a symbol over different reception beams. For instance, similar to that illustrated and described above with respect to FIG. 9, the base station may simultaneously measure the SNRs over reception beams X and Y during the first SRS symbol carried over transmission beam A, as well as the SNRs over reception beam Z and W during the second SRS symbol also carried over transmission beam A. In such case, the base station may determine that reception beam X is associated with the highest SNR. Thus, the base station may identify reception beam X for the initial transmission beams carrying the SRS. Then, at 1242, the base station may identify a distinguishable beam pair for the SRS. For instance, similar to that illustrated and described above with respect to FIGS. 5 and 9, the base station may check the set of distinguishable beam pairs (e.g., distinguishable beam pairs 1212) and determine that reception beam X is paired with transmission beam A. As a result, the base station may determine that the first and second SRS symbols were transmitted over transmission beam A, and thus that the transmission beam sequence determined at 1232 begins with transmission beam A. Furthermore, at 1244, the base station may refrain from performing subsequent channel measurements with the distinguishable beam pair. For instance, similar to that illustrated and described above with respect to FIG. 9, the base station may determine that transmission beam A will not be used for the remaining SRS symbols since the UE does not transmit sequences with duplicate or missing transmission beams, and so the base station may eliminate reception beam X from its subsequent measurements. As a result, when the UE transmits the next two SRS symbols over transmission beam B, the base station may only measure SNRs over reception beams Y, Z, and W (and not X). The base station may then repeat the aforementioned process over the remaining SRS symbols, similar to that illustrated and described above with respect to FIG. 9, to identify the other reception beams, including reception beam Y for the third and fourth SRS symbols carried over transmission beam B, reception beam Z for the fifth SRS symbol carried over transmission beam C, and reception beam W for the sixth SRS symbol carried over transmission beam D. In this way, the base station may identify the reception beams X, Y, Z, and W for each of the transmission beams A, B, C, and D in the UE determined sequence.

As a result, at 1246, the base station may determine the sequence of transmission beams which the UE determined at 1232. For example, similar to that illustrated and described above with respect to FIG. 9, in response to identifying reception beam X for the first and second SRS symbols, the base station may determine that the transmission beam sequence begins with A. Similarly, in response to identifying reception beam Y for the third and fourth SRS symbols, the base station may determine that the transmission beam sequence continues with B. Similarly, in response to identifying reception beam Z for the fifth SRS symbol, the base station may determine that the transmission beam sequence continues with C. Similarly, in response to identifying reception beam W for the sixth SRS symbol, the base station may determine that the transmission beam sequence ends with D. Therefore, the base station may determine the transmission beam sequence to be A-B-C-D in response to identifying the reception beams for each transmission beam at 1238.

The base station may similarly identify reception beams for each transmission beam at 1238 and determine the sequence of transmission beams at 1246 based on the configuration 1214 of transmission beam groups. For example, similar to that illustrated and described above with respect to FIG. 10, the base station may simultaneously measure SNRs over reception beams X and W during the first SRS symbol and over reception beams Y and Z during the second SRS symbol, and determine that reception beam W is associated with the highest SNR. Thus, the base station may identify reception beam W for the initial transmission beams carrying the SRS, determine that the first and second SRS symbols were accordingly carried over transmission beam D, and infer from the determined transmission beam D that the UE has initially selected Group 1={A, D}. In response to determining that Group 1 was selected by the UE, the base station may perform multiple SNR measurements during the third SRS symbol and identify reception beam X for the next transmission beam A, since A and D are in the same transmission beam group. The base station may then perform multiple SNR measurements during the fourth SRS symbol and identify reception beam Z for the next transmission beam C, and similarly reception beam Y for the last transmission beam B, while eliminating reception beams X and W during these SNR measurements based on the determination that Group 2={B, C} is now selected. As a result, the base station may determine the sequence of transmission beams to be D-A-C-B in the example of FIG. 10.

Alternatively, if any indistinguishable reception beams are present in the distinguishable beam pairs 1212, the UE may separate associated transmission beams into different groups in the configuration 1214. Based on the configuration 1214 of transmission beam groups, the base station may similarly identify reception beams for each transmission beam at 1238 and determine the sequence of transmission beams at 1246. For instance, similar to that illustrated and described above with respect to FIG. 11, the base station may identify reception beam X for the first two SRS symbols carried over transmission beam A, reception beam W for the next two SRS symbols carried over transmission beam D, and reception beams Z and X for the final two SRS symbols carried over transmission beams C and B respectively. Moreover, the base station may determine the sequence of transmission beams to be A-D-C-B in this example of FIG. 11.

Thus, while 1216, 1218, 1220, 1222, 1224, 1226, 1228, and 1230 refer to a base station (or other wireless device 1204) determining a sequence of transmission beams, the base station sending CSI-RS symbols over each transmission beam to the UE, the UE performing multiple RF measurements during each CSI-RS symbol to identify the best reception beams, and the UE (or other wireless device 1202) subsequently determining the transmission beam sequence which the base station impliedly conveys, the roles of the base station and UE may be reversed, as described above with respect to 1232, 1234, 1236, 1238, 1240, 1242, 1244, and 1246. The role of the base station and UE in either example may depend on the identity of the receiving device in beam management (the device managing reception beams). For example, if beam management is performed with CSI-RS and the receiving device is wireless device 1202 (e.g., a UE), then the process may be performed as described above with respect to 1216, 1218, 1220, 1222, 1224, 1226, 1228, and 1230. Alternatively, if beam management is performed with SRS and the receiving device is wireless device 1204 (e.g., a base station), then the process may be performed as similarly described above with respect to 1232, 1234, 1236, 1238, 1240, 1242, 1244, and 1246.

Figure 13:
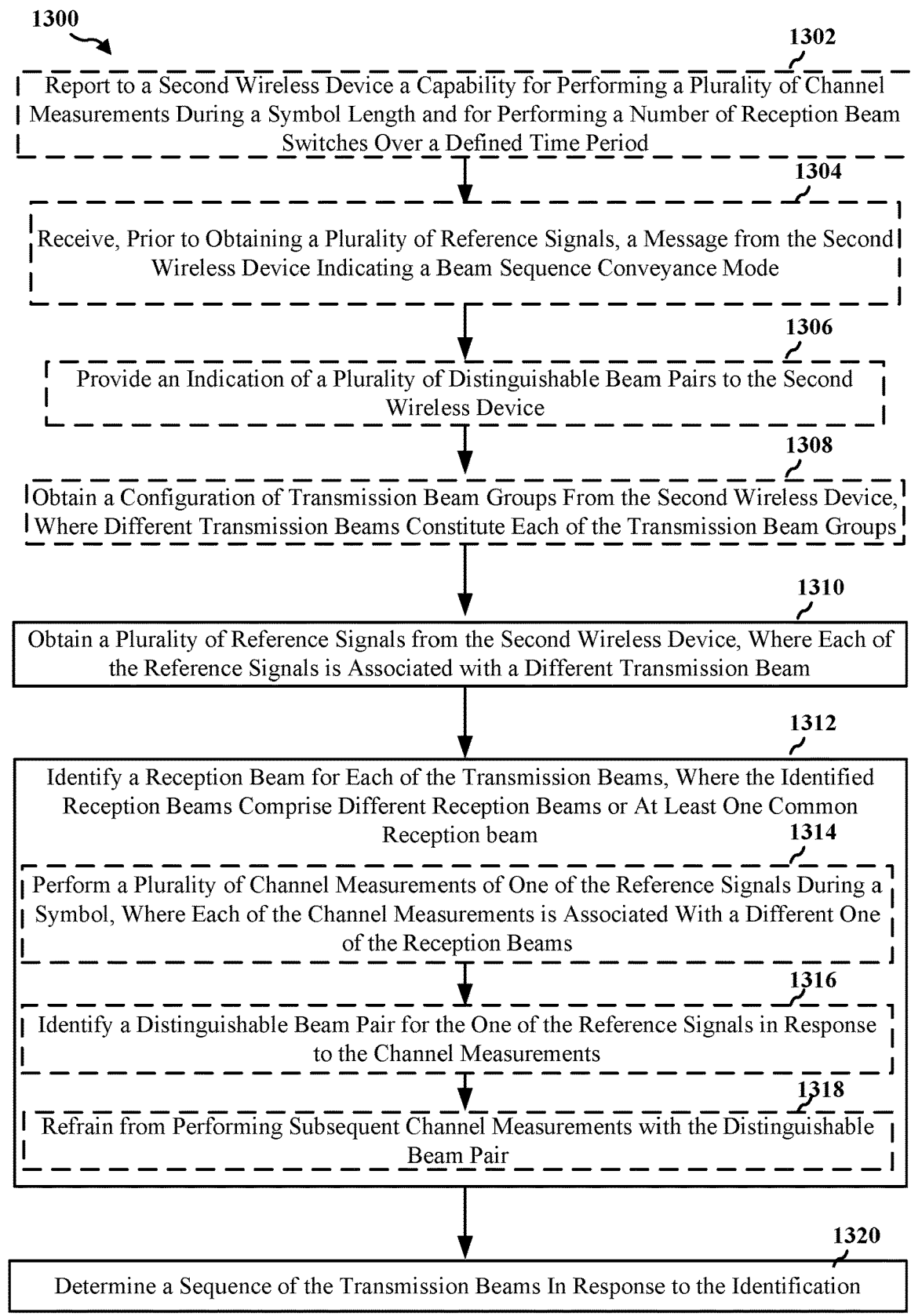
FIG. 13 is a flowchart of a method of wireless communication.

FIG. 13 is a flowchart 1300 of a method of wireless communication. The method may be performed by a first wireless device (e.g., wireless device 1202 or 1204, the apparatus 1502, 1602). For example, the first wireless device may be UE (e.g., the UE 104, 350, 408), a relay or sidelink node, a CPE, a repeater, or an IAB node. Alternatively, the first wireless device may be a base station (e.g., the base station 102/180, 310, 406), a TRP, a repeater, or an IAB node. Optional aspects are illustrated in dashed lines. The method allows the first wireless device (a receiving device) in beam management to determine a sequence of transmission beams impliedly conveyed by a second wireless device (a transmitting device) in a beam sequence conveyance mode.

At 1302, the first wireless device may report to the second wireless device a capability for performing a plurality of channel measurements during a symbol length and for performing a number of reception beam switches over a defined time period. For example, 1302 may be performed by capability report component 1540, 1640. For instance, as described above with respect to FIG. 12, wireless device 1202 may provide a capability report 1206 to wireless device 1204 indicating a capability of wireless device 1202 to perform multiple RF measurements during a symbol length (e.g., two, four, or other number of measurements) and for performing a number of reception beam switches over a defined time period (e.g., ten measurements over six symbols). The report may also indicate a maximum number of reception beam switches that are performable during a time period over one of the transmission beams. For instance, capability report 1206 may indicate that wireless device 1202 may perform up to two, four, or other maximum number of measurements during a time period (e.g., two symbols) of reference signals carried over the same transmission beam.

At 1304, the first wireless device may receive, prior to obtaining a plurality of reference signals, a message from the second wireless device indicating a beam sequence conveyance mode. For example, 1304 may be performed by message component 1542, 1642. For instance, as described above with respect to FIG. 12, wireless device 1202 may receive a message 1208 from wireless device 1204 indicating a beam sequence conveyance mode prior to receiving CSI-RS 1220. The beam sequence conveyance mode may indicate to wireless device 1202 whether wireless device 1204 will impliedly convey an arbitrarily determined sequence of transmission beams during beam management, such as described above with respect to FIGS. 9-11, or whether the wireless device 1204 will merely transmit CSI-RS symbols according to a fixed transmission beam sequence during beam management (e.g., a pre-configured sequence previously agreed between the base station and UE or some other fixed sequence), such as described above with respect to FIG. 6.

At 1306, the first wireless device may provide an indication of a plurality of distinguishable beam pairs to the second wireless device. For example, 1306 may be performed by distinguishable beam pair component 1544, 1646. The distinguishable beam pairs may also be updated in response to changes in channel conditions. For instance, as described above with respect to FIG. 12, wireless device 1202 may provide a set of distinguishable beam pairs 1212 to wireless device 1204. For example, as described above with respect to FIG. 5, the UE may report to the base station an indication that beam pairs AX, BY, CZ, and DW are distinguishable beam pairs. Additionally, wireless device 1202 may constantly update and report the set of distinguishable beam pairs 1212 to wireless device 1204 in response to changes in channel conditions (e.g., in response to user mobility, change in channel environment, blockage conditions, etc.).

At 1308, the first wireless device may obtain a configuration of transmission beam groups from the second wireless device, where different transmission beams constitute each of the transmission beam groups. For example, 1308 may be performed by transmission beam group component 1546, 1648. For instance, as described above with respect to FIG. 12, wireless device 1202 may obtain configuration 1214 of transmission beam groups from wireless device 1204. The transmission beam groups may include different transmission beams, such as described above with respect to FIGS. 10 and 11. The transmission beam groups may also be specific to the first wireless device. For example, wireless device 1204 (e.g., a base station) may configure a specific number of groups with specific transmission beams for wireless device 1202 (e.g., one UE), such as Group 1: {A, D} and Group 2: {B, C}, while configuring a different number of groups with different transmission beams for another wireless device (e.g., another UE).

Furthermore, two or more transmission beams of beam pairs having a common one of the reception beams may be separated into different transmission beam groups. For example, as described above with respect to FIG. 11, if during beam training, wireless device 1202 identifies and reports the best K beam pairs as AX, BX, CZ, and DW, then transmission beams A and B are both associated with common reception beam X, which is therefore not a distinguishable reception beam. As a result, wireless device 1204 may select the groups such that Group 1={A, D} and Group 2={B, C} to ensure that transmission beams A and B are in different transmission beam groups and thus are pairwise distinguishable within each group.

At 1310, the first wireless device obtains the plurality of reference signals from a second wireless device, where each of the reference signals is associated with a different transmission beam. For example, 1310 may be performed by reference signal component 1548, 1652. For instance, as described above with respect to FIG. 12, wireless device 1202 may obtain CSI-RS 1220 from wireless device 1204 over various transmission beams that wireless device 1204 may associate with the reference signals at 1218. For example, as illustrated and described above with respect to FIGS. 7A-7B and 9-11, the base station may configure CSI-RS symbols 702, 752, 902, 1002, 1102 for transmission to the UE over different transmission beams (e.g., transmission beams 402 in FIG. 4, such as A, B, C, D) according to the transmission beam sequence determined at 1216. Similarly, wireless device 1204 may obtain SRS 1236 from wireless device 1202 over various transmission beams that wireless device 1202 may associate with the reference signals at 1234.

At 1312, the first wireless device identifies a reception beam for each of the transmission beams, where the identified reception beams comprise different reception beams or at least one common reception beam. For example, 1312 may be performed by reception beam component 1550. For instance, as described above with respect to FIG. 12, at 1222, wireless device 1202 may identify a reception beam for each of the transmission beams carrying CSI-RS 1220. For example, as illustrated and described above with respect to FIGS. 9-11, the UE may identify a best reception beam (e.g., a reception beam associated with the highest SNR) for receiving each CSI-RS symbol 702, 752, 902, 1002, 1102 over the various transmission beams that wireless device 1204 associates with the reference signals. The UE may identify different reception beams such as illustrated in FIGS. 9 and 10 (e.g., X, Y, Z, W), or at least one common reception beam such as illustrated in FIG. 11 (e.g., X, X, Z, W). Similarly, at 1238, wireless device 1204 may identify a reception beam for each of the transmission beams carrying SRS 1236.

The first wireless device may identify reception beams at 1312 in response to steps 1314, 1316, and 1318. For instance, at 1314, the first wireless device may perform a plurality of channel measurements of one of the reference signals during a symbol, where each of the channel measurements is associated with a different one of the reception beams. For example, 1314 may be performed by reception beam component 1550. For instance, as described above with respect to FIG. 12, at 1224, wireless device 1202 may perform a plurality of channel measurements of CSI-RS 1220 during a symbol (e.g., CSI-RS symbol 702, 752, 902, 1002, 1102) over different reception beams. For instance, as illustrated and described above with respect to FIG. 9, the UE may simultaneously measure the SNRs over reception beams X and Y during the first CSI-RS symbol carried over transmission beam A, as well as the SNRs over reception beam Z and W during the second CSI-RS symbol also carried over transmission beam A. In such case, the UE may determine that reception beam X is associated with the highest SNR. Thus, the UE may identify reception beam X for the initial transmission beams carrying the CSI-RS. Similarly, at 1240, wireless device 1204 may perform a plurality of channel measurements of SRS 1236 during a symbol over different reception beams.

Next, at 1316, the first wireless device identifies a distinguishable beam pair for the one of the reference signals in response to the channel measurements. For example, 1316 may be performed by reception beam component 1550. One of the distinguishable beam pairs may include one of the transmission beams and one of the reception beams, and a difference between a first signal strength of the reference signal associated with the one of the transmission beams received over the one of the reception beams and a second signal strength of the reference signal associated with the one of the transmission beams received over another of the reception beams may exceed a signal strength threshold. The signal strength threshold may be obtained in a configuration from the second wireless device. For instance, as described above with respect to FIG. 12, at 1226, wireless device 1202 may identify a distinguishable beam pair for the CSI-RS 1220 in response to the measurements performed at 1224. The distinguishable beam pair may be one of the distinguishable beam pairs 1212 reported to wireless device 1204. For example, as illustrated and described above with respect to FIGS. 5 and 9, in response to determining that reception beam X is associated with the highest SNR, the UE may check the set of distinguishable beam pairs 502 and identify that AX is a distinguishable beam pair in the set, where the difference between the SNR of AX and the maximum SNR of (AY, AZ, AW) exceeds the signal strength threshold (e.g., $SNR_{threshold}$) obtained from the base station. $SNR_{threshold}$ may correspond to the signal strength threshold 1210 that wireless device 1202 obtains from wireless device 1204 in FIG. 12. The UE may also determine that reception beam X is paired with transmission beam A in the distinguishable beam pairs. As a result, the UE may determine that the first and second CSI-RS symbols were transmitted over transmission beam A, and thus that the transmission beam sequence determined at 1216 begins with transmission beam A. Similarly, at 1242, wireless device 1204 may identify a distinguishable beam pair for the SRS 1236 in response to the measurements performed at 1240, and likewise identify that the transmission beam sequence determined at 1232 begins with transmission beam A.

Then, at 1318, the first wireless device refrains from performing subsequent channel measurements with the distinguishable beam pair. For example, 1318 may be performed by reception beam component 1550. For example, as described above with respect to FIG. 12, at 1228, wireless device 1202 may refrain from performing subsequent channel measurements with the distinguishable beam pair identified at 1226. For instance, as illustrated and described above with respect to FIG. 9, after determining that reception beam X is paired with transmission beam A in the distinguishable beam pairs and thus that the first and second CSI-RS symbols were transmitted over transmission beam A, the UE may determine that transmission beam A will not be used for the remaining CSI-RS symbols since the base station does not transmit sequences with duplicate or missing transmission beams. Therefore, the UE may eliminate reception beam X from its subsequent measurements. As a result, when the base station transmits the next two CSI-RS symbols over transmission beam B, the UE may only measure SNRs over reception beams Y, Z, and W (and not X). Similarly, at 1244, wireless device 1204 may refrain from performing subsequent channel measurements with the distinguishable beam pair identified at 1242, and after determining that reception beam X is paired with transmission beam A in the distinguishable beam pairs, likewise only measure SNRs over reception beams Y, Z, and W (and not X).

The first wireless device may then repeat the aforementioned process described at 1312, 1314, 1316, and 1318 over the remaining reference signal symbols to identify the other reception beams. For instance, referring to FIG. 12, after wireless device 1202 identifies at 1222 a reception beam X for the first and second CSI-RS symbols carried over transmission beam A, the wireless device may apply similar processes at 1222, 1224, 1226 and 1228 to identify the other reception beams. For example, as illustrated and described above with respect to FIG. 9, the UE may identify reception beam Y for the third and fourth CSI-RS symbols carried over transmission beam B, reception beam Z for the fifth CSI-RS symbol carried over transmission beam C, and reception beam W for the sixth CSI-RS symbol carried over transmission beam D. In this way, the UE may identify the reception beams X, Y, Z, and W for each of the transmission beams A, B, C, and D in the base station determined sequence. Similarly, after wireless device 1204 identifies at 1238 a reception beam X for the first and second SRS symbols carried over transmission beam A, the wireless device may apply similar processes at 1238, 1240, 1242, and 1244 to identify the other reception beams.

Finally, at 1320, the first wireless device determines a sequence of the transmission beams in response to the identification. For example, 1320 may be performed by sequence determination component 1552. The sequence may be determined in response to the message. For instance, as described above with respect to FIG. 12, at 1230, wireless device 1202 may determine the sequence of transmission beams selected by wireless device 1204 at 1216 in response to identifying the reception beams at 1222. For example, as illustrated and described above with respect to FIG. 9, in response to identifying reception beam X for the first and second CSI-RS symbols, the UE may determine that the transmission beam sequence begins with A. Next, in response to identifying reception beam Y for the third and fourth CSI-RS symbols, the UE may determine that the transmission beam sequence continues with B. Subsequently, in response to identifying reception beam Z for the fifth CSI-RS symbol, the UE may determine that the transmission beam sequence continues with C. Finally, in response to identifying reception beam W for the sixth CSI-RS symbol, the UE may determine that the transmission beam sequence ends with D. Therefore, the UE may determine the transmission beam sequence to be A-B-C-D (in the example of FIG. 9) in response to identifying the reception beams for each transmission beam at 1222. Similarly, at 1246, wireless device 1204 may determine the sequence of transmission beams selected by wireless device 1202 at 1232 in response to identifying the reception beams at 1238. Wireless device 1202 may perform the processes at 1222, 1224, 1226, 1228, and 1230 in response to receiving message 1208 from wireless device 1204 indicating the beam sequence conveyance mode. Similarly, wireless device 1204 may perform the processes at 1238, 1240, 1242, 1244, and 1246 in response to the beam sequence conveyance mode.

Figure 14:
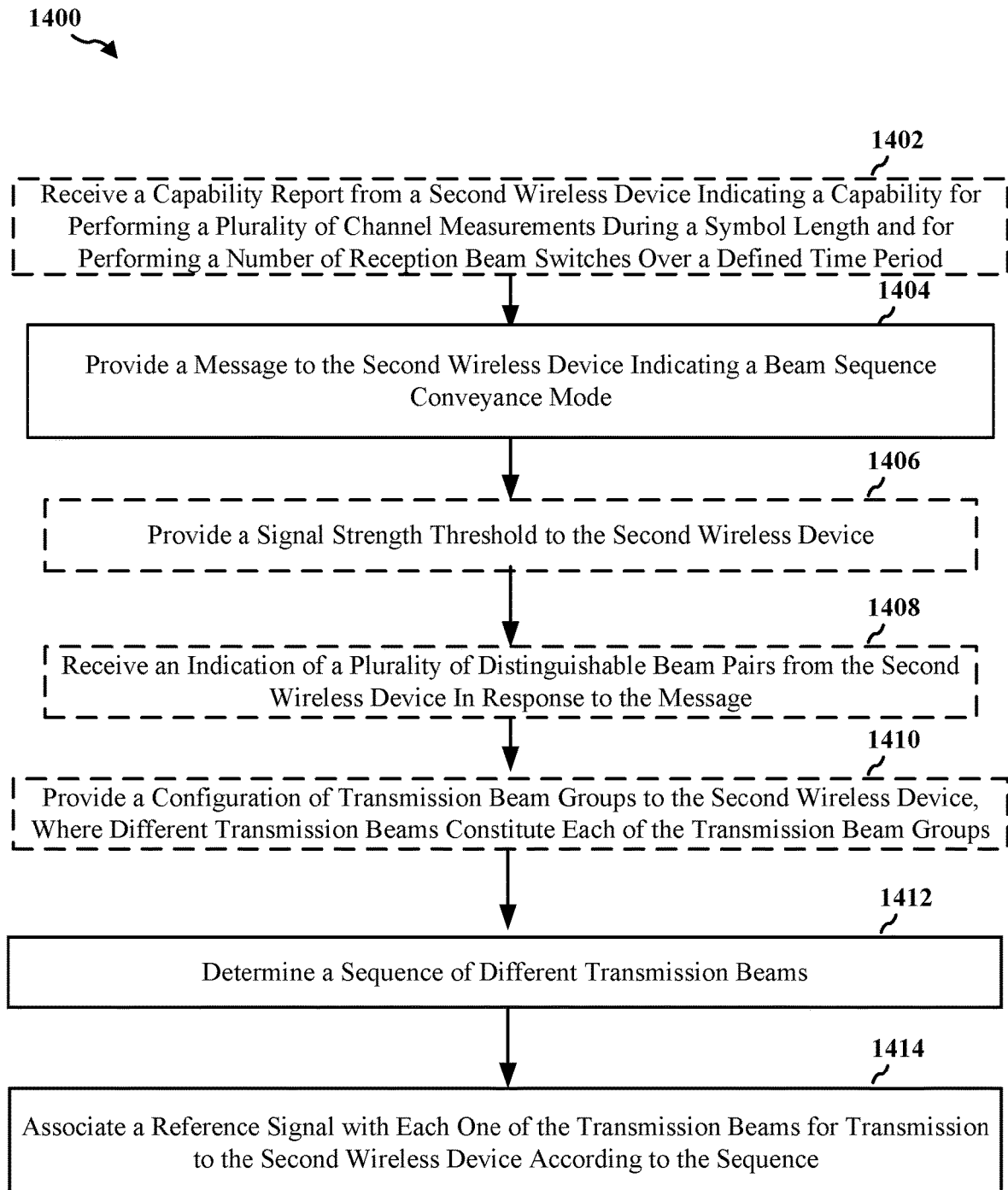
FIG. 14 is a flowchart of another method of wireless communication.

FIG. 14 is a flowchart 1400 of a method of wireless communication. The method may be performed by a first wireless device (e.g., wireless device 1204, the apparatus 1602). For example, the first wireless device may be a base station (e.g., the base station 102/180, 310, 406), a TRP, a repeater, or an IAB node. Optional aspects are illustrated in dashed lines. The method allows the first wireless device (a transmitting device) in beam management to impliedly convey a sequence of transmission beams to a second wireless device (a receiving device) in a beam sequence conveyance mode.

At 1402, the first wireless device may receive a capability report from the second wireless device indicating a capability for performing a plurality of channel measurements during a symbol length and for performing a number of reception beam switches over a defined time period. For example, 1402 may be performed by capability report component 1640. The report may indicate a maximum number of repetition beam switches that are performable by the second wireless device during a time period over one of the transmission beams. For instance, as described above with respect to FIG. 12, wireless device 1202 may provide a capability report 1206 to wireless device 1204 indicating a capability of wireless device 1202 to perform multiple RF measurements during a symbol length (e.g., two, four, or other number of measurements) and for performing a number of reception beam switches over a defined time period (e.g., ten measurements over six symbols). The report may also indicate a maximum number of reception beam switches that are performable during a time period over one of the transmission beams. For instance, capability report 1206 may indicate that wireless device 1202 may perform up to two, four, or other maximum number of measurements during a time period (e.g., two symbols) of reference signals carried over the same transmission beam.

At 1404, the first wireless device provides a message to the second wireless device indicating a beam sequence conveyance mode. For example, 1404 may be performed by message component 1642. The message may be provided in response to the capability report received at 1402. For instance, as described above with respect to FIG. 12, wireless device 1202 may receive a message 1208 from wireless device 1204 indicating a beam sequence conveyance mode prior to receiving CSI-RS 1220. The beam sequence conveyance mode may indicate to wireless device 1202 whether wireless device 1204 will impliedly convey an arbitrarily determined sequence of transmission beams during beam management, such as described above with respect to FIGS. 9-11, or whether the wireless device 1204 will merely transmit CSI-RS symbols according to a fixed transmission beam sequence during beam management (e.g., a pre-configured sequence previously agreed between the base station and UE or some other fixed sequence), such as described above with respect to FIG. 6.

At 1406, the first wireless device may provide a signal strength threshold to the second wireless device. For example, 1406 may be performed by signal strength threshold component 1644. For instance, wireless device 1204 may provide signal strength threshold 1210 (e.g., $SNR_{threshold}$ for distinguishable beam pairs) to wireless device 1202.

At 1408, the first wireless device may receive an indication of a plurality of distinguishable beam pairs from the second wireless device in response to the message provided at 1404. For example, 1408 may be performed by distinguishable beam pair component 1646. For instance, as described above with respect to FIG. 12, wireless device 1202 may provide a set of distinguishable beam pairs 1212 to wireless device 1204 in response to receiving message 1208. For example, as described above with respect to FIG. 5, the UE may report to the base station an indication that beam pairs AX, BY, CZ, and DW are distinguishable beam pairs.

One of the distinguishable beam pairs may include one of the transmission beams and one of a plurality of reception beams, where a difference between a first signal strength of the reference signal associated with the one of the transmission beams over the one of the reception beams and a second signal strength of the reference signal associated with the one of the transmission beams over another of the reception beams exceeds a signal strength threshold. For example, as described above with respect to FIG. 5, if beam pairs AX, AY, AZ, and AW are respectively associated with SNRs dB, 12 dB, 4 dB, and −2 dB respectively, where $SNR_{threshold}$=7 dB, then best beam pair AX is a distinguishable beam pair since the difference between its SNR (i.e. 25 dB) and the maximum SNR out of the SNRs associated with the other beam pairs AY, AZ, and AW (i.e., 12 dB, leading to a difference of 25-12=13 dB) exceeds $SNR_{threshold}$ (i.e., 13 dB>7 dB).

At 1410, the first wireless device may provide a configuration of transmission beam groups to the second wireless device, where different transmission beams constitute each of the transmission beam groups. For example, 1410 may be performed by transmission beam group component 1648. For instance, as described above with respect to FIG. 12, wireless device 1202 may obtain configuration 1214 of transmission beam groups from wireless device 1204. The transmission beam groups may include different transmission beams, such as described above with respect to FIGS. 10 and 11. The transmission beam groups may also be specific to the second wireless device. For example, wireless device 1204 (e.g., a base station) may configure a specific number of groups with specific transmission beams for wireless device 1202 (e.g., one UE), such as Group 1: {A, D} and Group 2: {B, C}, while configuring a different number of groups with different transmission beams for another wireless device (e.g., another UE).

Moreover, two or more transmission beams of beam pairs having a common reception beam may be separated into different transmission beam groups. For example, as described above with respect to FIG. 11, if during beam training, wireless device 1202 identifies and reports the best K beam pairs as AX, BX, CZ, and DW, then transmission beams A and B are both associated with common reception beam X, which is therefore not a distinguishable reception beam. As a result, wireless device 1204 may select the groups such that Group 1={A, D} and Group 2={B, C} to ensure that transmission beams A and B are in different transmission beam groups and thus are pairwise distinguishable within each group.

At 1412, the first wireless device may determine a sequence of different transmission beams. For example, 1412 may be performed by sequence component 1650. For instance, as described above with respect to FIG. 12, at 1216, wireless device 1204 may determine a sequence of transmission beams (e.g., transmission beams 402 in FIG. 4). For instance, the base station may arbitrarily determine a transmission beam sequence from one of multiple permutations or combinations of transmission beam candidates identified in the distinguished beam pairs of FIG. 5 (e.g., transmission beams A, B, C, D), such as one of the sequences illustrated and described above with respect to FIGS. 7A-7B and 9-11 (e.g., C-B-D-A, A-D-C-B, A-B-C-D, D-A-C-B, etc.). Moreover, when transmission beam groups are configured (e.g., in configuration 1214), the base station may also determine a group order and a beam order within each group when determining the sequence of transmission beams. For example, as described above with respect to FIGS. 10 and 11, the base station may determine the transmission beam sequence as a result of randomly selecting Group 1 or Group 2, the beam order in the randomly selected group, and then the beam order in the remaining group.

Finally, at 1414, the first wireless device may associate a reference signal with each one of the transmission beams for transmission to the second wireless device according to the sequence. For example, 1414 may be performed by reference signal component 1652. For instance, as described above with respect to FIG. 12, at 1218, wireless device 1204 may associate a CSI-RS with each transmission beam in the transmission beam sequence determined at 1216. For example, as illustrated and described above with respect to FIGS. 7A-7B and 9-11, the base station may configure CSI-RS symbols 702, 752, 902, 1002, 1102 for transmission over the various transmission beams in the determined transmission beam sequence. The number of CSI-RS symbols M may depend on the number of transmission beam candidates in the distinguished beam pairs 1212, the configuration 1214 of transmission beam groups if present, and the presence if any of indistinguishable reception beams in the distinguished beam pairs. The base station may then send the CSI-RS 1220 to the UEs over the transmission beams in the determined sequence. For example, the base station may send the CSI-RS to the UE for the UE to measure during beam management.

Figure 15:
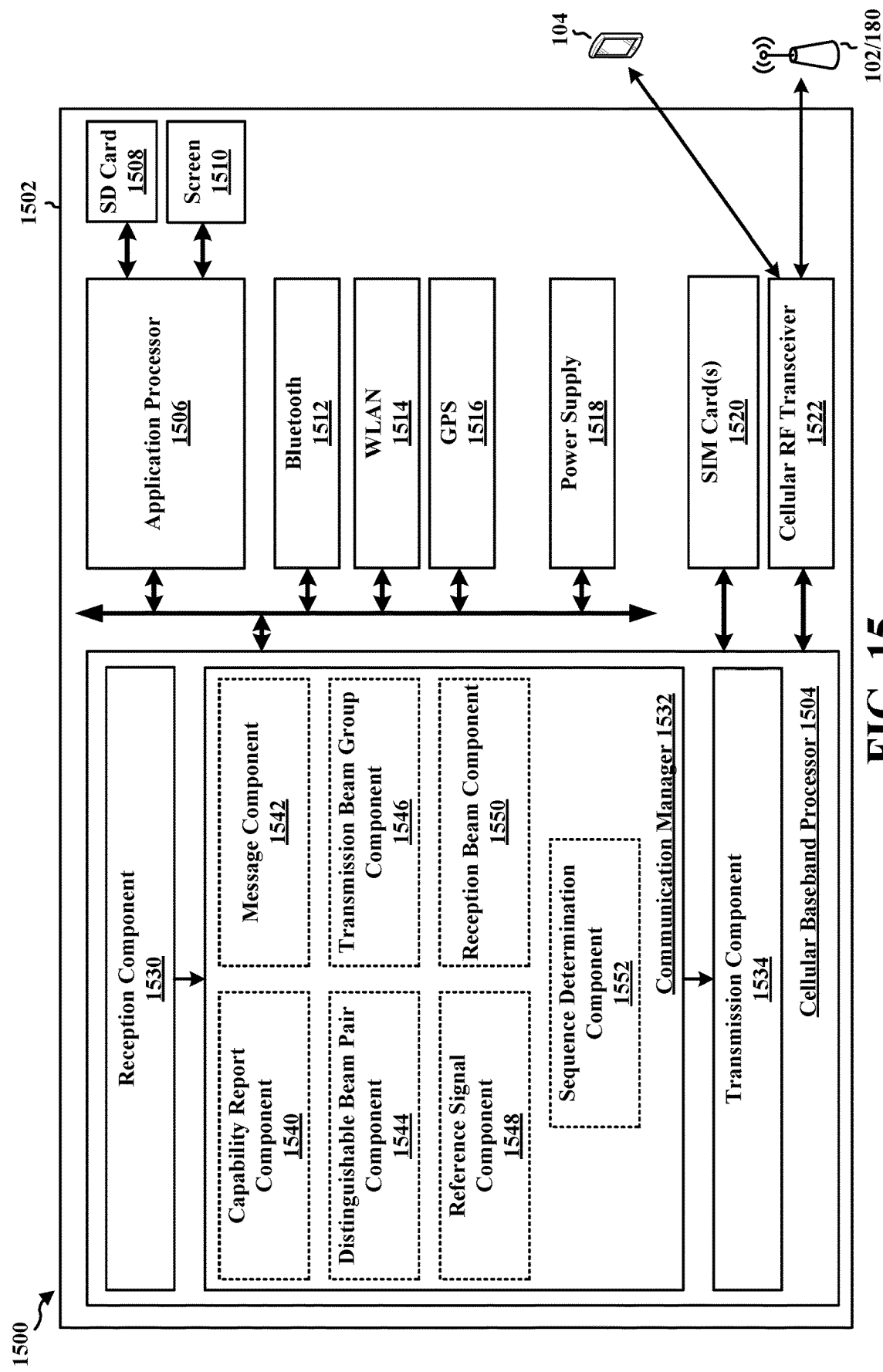
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a capability report component 1540 that is configured to report to the second wireless device a capability for performing a plurality of channel measurements during a symbol length and for performing a number of reception beam switches over a defined time period, e.g., as described in connection with 1302. The communication manager 1532 further includes a message component 1542 that receives input in the form of the capability from the capability report component 1540 and is configured to receive, prior to obtaining a plurality of reference signals, a message from the second wireless device indicating a beam sequence conveyance mode, e.g., as described in connection with 1304. The communication manager 1532 further includes a distinguishable beam pair component 1544 that receives input in the form of the message from the message component 1542 and is configured to provide an indication of a plurality of distinguishable beam pairs to the second wireless device, e.g., as described in connection with 1306. The communication manager 1532 further includes a transmission beam group component 1546 that receives input in the form of the message from the message component 1542 and is configured to obtain a configuration of transmission beam groups from the second wireless device, where different transmission beams constitute each of the transmission beam groups, e.g., as described in connection with 1308. The communication manager 1532 further includes a reference signal component 1548 that receives input in the form of the message from the message component 1542 and is configured to obtain a plurality of reference signals from a second wireless device, wherein each of the reference signals is associated with a different transmission beam, e.g., as described in connection with 1310. The communication manager 1532 further includes a reception beam component 1550 that receives input in the form of the message from the message component 1542 and is configured to identify a reception beam for each of the transmission beams, where the identified reception beams comprise different reception beams or at least one common reception beam, e.g., as described in connection with 1312, 1314, 1316, and 1318. The communication manager 1532 further includes a sequence determination component 1552 that receives input in the form of the message from the message component 1542 and is configured to determine a sequence of the transmission beams in response to the identification, e.g., as described in connection with 1320.

The apparatus may include additional components that perform each of the blocks of the algorithm in the aforementioned flowcharts of FIGS. 12 and 13. As such, each block in the aforementioned flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for obtaining a plurality of reference signals from a second wireless device, wherein each of the reference signals is associated with a different transmission beam; means for identifying a reception beam for each of the transmission beams, where the identified reception beams comprise different reception beams or at least one common reception beam; and means for determining a sequence of the transmission beams in response to the identification.

In one configuration, the apparatus 1502, and in particular the cellular baseband processor 1504, may include means for performing a plurality of channel measurements of one of the reference signals during a symbol, wherein each of the channel measurements is associated with a different one of the reception beams.

In one configuration, the apparatus 1502, and in particular the cellular baseband processor 1504, may include means for identifying a distinguishable beam pair for the one of the reference signals in response to the channel measurements; and means for refraining from performing subsequent channel measurements with the distinguishable beam pair.

In one configuration, the apparatus 1502, and in particular the cellular baseband processor 1504, may include means for providing an indication of a plurality of distinguishable beam pairs to the second wireless device.

In one configuration, the apparatus 1502, and in particular the cellular baseband processor 1504, may include means for reporting to the second wireless device a capability for performing a plurality of channel measurements during a symbol length and for performing a number of reception beam switches over a defined time period.

In one configuration, the apparatus 1502, and in particular the cellular baseband processor 1504, may include means for obtaining a configuration of transmission beam groups from the second wireless device, wherein different transmission beams constitute each of the transmission beam groups.

In one configuration, the apparatus 1502, and in particular the cellular baseband processor 1504, may include means for receiving, prior to obtaining the plurality of reference signals, a message from the second wireless device indicating a beam sequence conveyance mode, wherein the sequence is further determined in response to the message.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
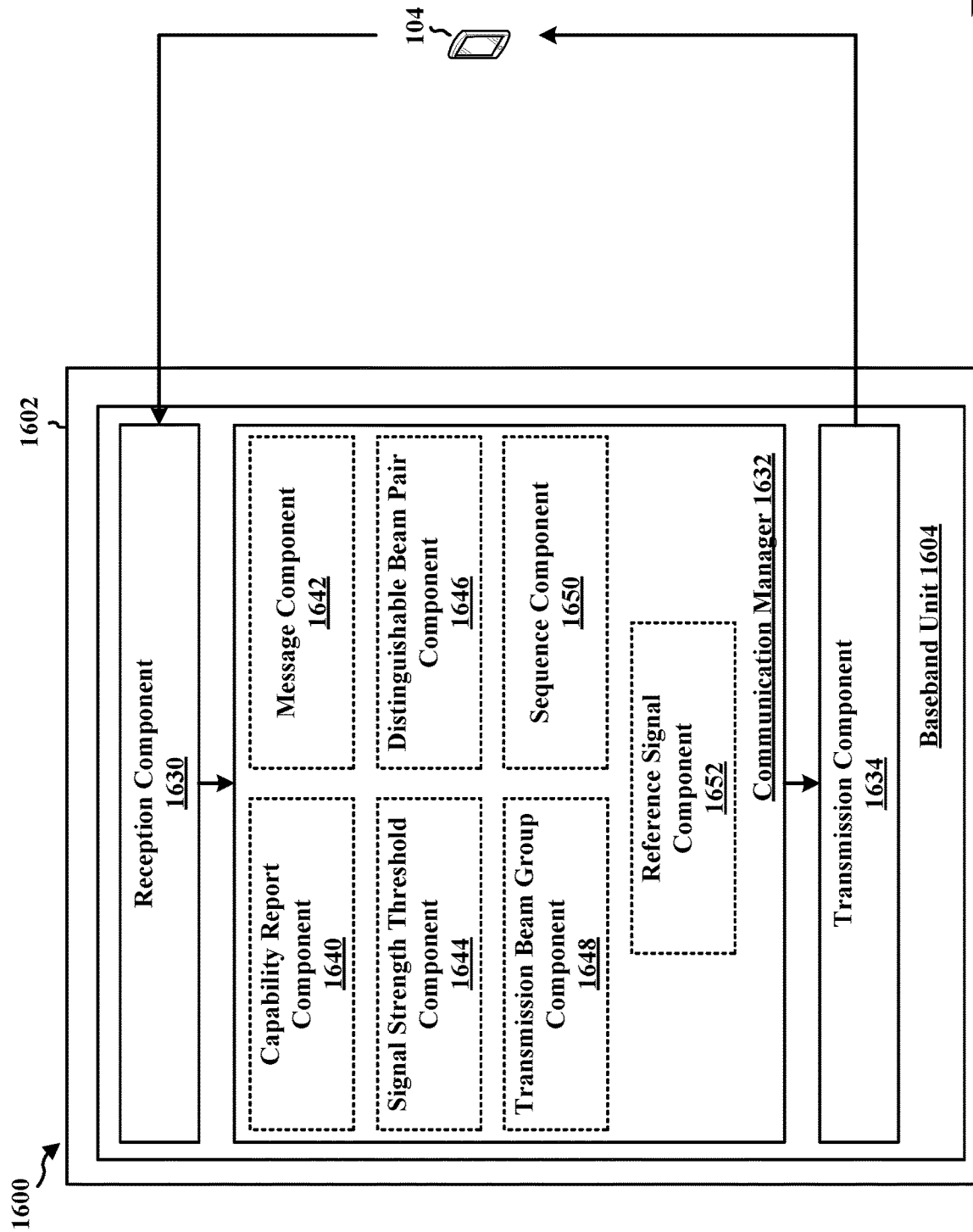
FIG. 16 is a diagram illustrating another example of a hardware implementation for another example apparatus.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes a capability report component 1640 that is configured to receive a capability report from the second wireless device indicating a capability for performing a plurality of channel measurements during a symbol length and for performing a number of reception beam switches over a defined time period, wherein the message is provided in response to the report, e.g., as described in connection with 1402. The communication manager 1632 further includes a message component 1642 that is configured to provide a message to a second wireless device indicating a beam sequence conveyance mode, e.g., as described in connection with 1404. The communication manager 1632 further includes a signal strength threshold component 1644 that is configured to provide a signal strength threshold to the second wireless device, e.g., as described in connection with 1406. The communication manager 1632 further includes a distinguishable beam pair component 1646 that is configured to receive an indication of a plurality of distinguishable beam pairs from the second wireless device in response to the message, e.g., as described in connection with 1408. The communication manager 1632 further includes a transmission beam group component 1648 that is configured to provide a configuration of transmission beam groups to the second wireless device, wherein different transmission beams constitute each of the transmission beam groups, e.g., as described in connection with 1410. The communication manager 1632 further includes a sequence component 1650 that is configured to determine a sequence of different transmission beams, e.g., as described in connection with 1412. The communication manager 1632 further includes a reference signal component 1652 that is configured to associate a reference signal with each one of the transmission beams for transmission to the second wireless device according to the sequence, e.g., as described in connection with 1414.

The apparatus may include additional components that perform each of the blocks of the algorithm in the aforementioned flowcharts of FIGS. 12 and 14. As such, each block in the aforementioned flowcharts of FIGS. 12 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for providing a message to a second wireless device indicating a beam sequence conveyance mode; means for determining a sequence of different transmission beams; and means for associating a reference signal with each one of the transmission beams for transmission to the second wireless device according to the sequence.

In one configuration, the apparatus 1602, and in particular the baseband unit 1604, may include means for receiving an indication of a plurality of distinguishable beam pairs from the second wireless device in response to the message.

In one configuration, the apparatus 1602, and in particular the baseband unit 1604, may include means for providing the signal strength threshold to the second wireless device.

In one configuration, the apparatus 1602, and in particular the baseband unit 1604, may include means for receiving a capability report from the second wireless device indicating a capability for performing a plurality of channel measurements during a symbol length and for performing a number of reception beam switches over a defined time period, wherein the message is provided in response to the report.

In one configuration, the apparatus 1602, and in particular the baseband unit 1604, may include means for providing a configuration of transmission beam groups to the second wireless device, wherein different transmission beams constitute each of the transmission beam groups.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

During beam management, a transmitting device may provide reference signals over various transmission beams for a receiving device to perform beam signal strength measurements. However, the transmitting device generally does not convey information to the receiving device regarding the sequence of the various transmission beams. Aspects of the present disclosure allow the transmitting device to provide reference signals to a receiving device for beam management according to an arbitrarily determined sequence of transmission beams at any time, and to implicitly convey information regarding the determined sequence of transmission beams to the receiving device. Such implicit conveyance of transmission beam sequences may result in reduced overhead compared to explicit messages indicating the beam sequence, thereby saving resources. Moreover, the transmitting device may change a transmission beam sequence (e.g., to a sequence other than a pre-configured sequence for beam refinement) at any time, regardless of blockage or interference or similar beam failure conditions, since the receiving device may be able to determine the sequence during the measurement process.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a first wireless device, comprising: obtaining a plurality of reference signals from a second wireless device, wherein each of the reference signals is associated with a different transmission beam; identifying a reception beam for each of the transmission beams, where the identified reception beams comprise different reception beams or at least one common reception beam; and determining a sequence of the transmission beams in response to the identification.

Example 2 is the method of Example 1, further comprising: performing a plurality of channel measurements of one of the reference signals during a symbol, wherein each of the channel measurements is associated with a different one of the reception beams.

Example 3 is the method of Example 2, further comprising: identifying a distinguishable beam pair for the one of the reference signals in response to the channel measurements; and refraining from performing subsequent channel measurements with the distinguishable beam pair.

Example 4 is the method of any of Examples 1 to 3, further comprising: providing an indication of a plurality of distinguishable beam pairs to the second wireless device.

Example 5 is the method of Example 4, wherein one of the distinguishable beam pairs includes one of the transmission beams and one of the reception beams, and wherein a difference between a first signal strength of the reference signal associated with the one of the transmission beams received over the one of the reception beams and a second signal strength of the reference signal associated with the one of the transmission beams received over another of the reception beams exceeds a signal strength threshold.

Example 6 is the method of Example 5, wherein the signal strength threshold is obtained in a configuration from the second wireless device.

Example 7 is the method of any of Examples 4 to 6, wherein the distinguishable beam pairs are updated in response to changes in channel conditions.

Example 8 is the method of any of Examples 1 to 7, further comprising: reporting to the second wireless device a capability for performing a plurality of channel measurements during a symbol length and for performing a number of reception beam switches over a defined time period.

Example 9 is the method of Example 8, wherein the report indicates a maximum number of reception beam switches that are performable during a time period over one of the transmission beams.

Example 10 is the method of any of Examples 1 to 9, further comprising: obtaining a configuration of transmission beam groups from the second wireless device, wherein different transmission beams constitute each of the transmission beam groups.

Example 11 is the method of Example 10, wherein the transmission beam groups are specific to the first wireless device.

Example 12 is the method of any of Examples 10 and 11, wherein two or more transmission beams of beam pairs having a common one of the reception beams are separated into different transmission beam groups.

Example 13 is the method of any of Examples 1 to 12, further comprising: receiving, prior to obtaining the plurality of reference signals, a message from the second wireless device indicating a beam sequence conveyance mode, wherein the sequence is further determined in response to the message.

Example 14 is an apparatus for wireless communication, comprising: a processor; memory coupled with the processor; and instructions stored in the memory and operable, when executed by the processor, to cause the apparatus to: obtain a plurality of reference signals from a wireless device, wherein each of the reference signals is associated with a different transmission beam; identify a reception beam for each of the transmission beams, where the identified reception beams comprise different reception beams or at least one common reception beam; and determine a sequence of the transmission beams in response to the identification.

Example 15 is the apparatus of Example 14, wherein the instructions, when executed by the processor, further cause the apparatus to: perform a plurality of channel measurements of one of the reference signals during a symbol, wherein each of the channel measurements is associated with a different one of the reception beams.

Example 16 is the apparatus of Example 15, wherein the instructions, when executed by the processor, further cause the apparatus to: identify a distinguishable beam pair for the one of the reference signals in response to the channel measurements; and refrain from performing subsequent channel measurements with the distinguishable beam pair.

Example 17 is the apparatus of any of Examples 14 to 16, wherein the instructions, when executed by the processor, further cause the apparatus to: provide an indication of a plurality of distinguishable beam pairs to the wireless device.

Example 18 is a method of wireless communication at a first wireless device, comprising: providing a message to a second wireless device indicating a beam sequence conveyance mode; determining a sequence of different transmission beams; and associating a reference signal with each one of the transmission beams for transmission to the second wireless device according to the sequence.

Example 19 is the method of Example 18, further comprising: receiving an indication of a plurality of distinguishable beam pairs from the second wireless device in response to the message.

Example 20 is the method of Example 19, wherein one of the distinguishable beam pairs includes one of the transmission beams and one of a plurality of reception beams, and wherein a difference between a first signal strength of the reference signal associated with the one of the transmission beams over the one of the reception beams and a second signal strength of the reference signal associated with the one of the transmission beams over another of the reception beams exceeds a signal strength threshold.

Example 21 is the method of Example 20, further comprising: providing the signal strength threshold to the second wireless device.

Example 22 is the method of any of Examples 18 to 21, further comprising: receiving a capability report from the second wireless device indicating a capability for performing a plurality of channel measurements during a symbol length and for performing a number of reception beam switches over a defined time period, wherein the message is provided in response to the report.

Example 23 is the method of Example 22, wherein the report indicates a maximum number of reception beam switches that are performable by the second wireless device during a time period over one of the transmission beams.

Example 24 is the method of any of Examples 18 to 23, further comprising: providing a configuration of transmission beam groups to the second wireless device, wherein different transmission beams constitute each of the transmission beam groups.

Example 25 is the method of Example 24, wherein the transmission beam groups are specific to the second wireless device.

Example 26 is the method of any of Examples 24 and 25, wherein two or more transmission beams of beam pairs having a common reception beam are separated into different transmission beam groups.

Example 27 is an apparatus for wireless communication, comprising: a processor; memory coupled with the processor; and instructions stored in the memory and operable, when executed by the processor, to cause the apparatus to: provide a message to a wireless device indicating a beam sequence conveyance mode; determine a sequence of different transmission beams; and associate a reference signal with each one of the transmission beams for transmission to the wireless device according to the sequence.

Example 28 is the apparatus of Example 27, wherein the instructions, when executed by the processor, further cause the apparatus to: provide a signal strength threshold to the wireless device.

Example 29 is the apparatus of any of Examples 27 and 28, wherein the instructions, when executed by the processor, further cause the apparatus to: receive a capability report from the wireless device indicating a capability for performing a plurality of channel measurements during a symbol length and for performing a number of reception beam switches over a defined time period, wherein the message is provided in response to the report.

Example 30 is the apparatus of any of Examples 27 to 29, wherein the instructions, when executed by the processor, further cause the apparatus to: provide a configuration of transmission beam groups to the wireless device, wherein different transmission beams constitute each of the transmission beam groups.

What is claimed is:

1. An apparatus for wireless communication, comprising:
a processing system that includes one or more processors and one or more memories coupled with the one or more processors, the processing system configured to cause the apparatus to:
obtain a plurality of downlink reference signals from a wireless device, each of the downlink reference signals being associated with a different transmission beam;
perform a plurality of channel measurements of at least one of the downlink reference signals during a symbol length based on a subcarrier spacing of the at least one of the downlink reference signals.

2. The apparatus of claim 1, wherein the downlink reference signals are obtained according to a sequence of the different transmission beams at a rate in bits per channel use (bpcu), the rate being based on at least one of:
a number of the plurality of downlink reference signals and a number of the different transmission beams,
a configuration of a plurality of transmission beam groups including the different transmission beams, or
an indication of a common reception beam for at least two of the different transmission beams.

3. The apparatus of claim 1, wherein the processing system is further configured to cause the apparatus to:
identify a beam pair for the at least one of the downlink reference signals in response to the channel measurements, each of the channel measurements performed during the symbol length being associated with a different reception beam, and the beam pair including one of the different reception beams and one of the different transmission beams; and
refrain from performing subsequent channel measurements with the beam pair.

4. The apparatus of claim 1, wherein the processing system is further configured to cause the apparatus to:
identify a reception beam for each of the different transmission beams, the identified reception beams being different reception beams; and
determine a sequence of the different transmission beams based on the identified reception beams.

5. The apparatus of claim 4, wherein the processing system is further configured to cause the apparatus to:
obtain a configuration of a plurality of transmission beam groups including the different transmission beams from the wireless device, the sequence being determined based on the plurality of transmission beam groups.

6. The apparatus of claim 4, wherein the processing system is further configured to cause the apparatus to:
identify a beam pair for the at least one of the downlink reference signals in response to the channel measurements, the beam pair including one of the different reception beams and one of the different transmission beams in a transmission beam group; and
refrain from performing subsequent channel measurements with beam pairs outside of the transmission beam group.

7. The apparatus of claim 1, wherein the processing system is further configured to cause the apparatus to:
identify a reception beam for each of the different transmission beams, the identified reception beams including at least one common reception beam for two of the different transmission beams; and
determine a sequence of the different transmission beams based on the identified reception beams.

8. The apparatus of claim 7, wherein the processing system is further configured to cause the apparatus to:
obtain a configuration of a plurality of transmission beam groups including the different transmission beams from the wireless device, wherein the two of the different transmission beams for the at least one common reception beam are in separate ones of the transmission beam groups, and the reception beams are identified based on the transmission beam groups.

9. The apparatus of claim 8, wherein the transmission beam groups are based on an indication from the apparatus of the at least one common reception beam.

10. The apparatus of claim 8, wherein the processing system is further configured to cause the apparatus to:
identify a beam pair for the at least one of the downlink reference signals in response to the channel measurements, the beam pair including the at least one common reception beam and one of the different transmission beams in one of the transmission beam groups; and
refrain from performing subsequent channel measurements with beam pairs in the one of the transmission beam groups.

11. The apparatus of claim 1, wherein a sequence of the different transmission beams is based on a selected order of transmission beam groups including the different transmission beams and a selected order of the different transmission beams in the each of the transmission beam groups.

12. An apparatus for wireless communication, comprising:
a processing system that includes one or more processors and one or more memories coupled with the one or more processors, the processing system configured to cause the apparatus to:
obtain a plurality of uplink reference signals from a wireless device, each of the uplink reference signals being associated with a different transmission beam; and
perform a plurality of channel measurements of at least one of the uplink reference signals during a symbol length based on a subcarrier spacing of the at least one of the uplink reference signals.

13. The apparatus of claim 12, wherein the processing system is further configured to cause the apparatus to:
identify a beam pair for the at least one of the uplink reference signals in response to the channel measurements, each of the channel measurements performed during the symbol length being associated with a different reception beam, and the beam pair including one of the different reception beams and one of the different transmission beams; and
refrain from performing subsequent channel measurements with the beam pair.

14. The apparatus of claim 12, wherein the processing system is further configured to cause the apparatus to:
identify a reception beam for each of the different transmission beams, the identified reception beams being different reception beams; and
determine a sequence of the different transmission beams based on the identified reception beams.

15. The apparatus of claim 14, wherein the processing system is further configured to cause the apparatus to:
provide a configuration of a plurality of transmission beam groups including the different transmission beams to the wireless device, the sequence being determined based on the plurality of transmission beam groups.

16. The apparatus of claim 14, wherein the processing system is further configured to cause the apparatus to:
identify a beam pair for the at least one of the uplink reference signals in response to the channel measurements, the beam pair including one of the different reception beams and one of the different transmission beams in a transmission beam group; and
refrain from performing subsequent channel measurements with beam pairs outside of the transmission beam group.

17. The apparatus of claim 12, wherein the processing system is further configured to cause the apparatus to:
identify a reception beam for each of the different transmission beams, the identified reception beams including at least one common reception beam for two of the different transmission beams; and
determine a sequence of the different transmission beams based on the identified reception beams.

18. The apparatus of claim 17, wherein the processing system is further configured to cause the apparatus to:
provide a configuration of a plurality of transmission beam groups including the different transmission beams to the wireless device, wherein the two of the different transmission beams for the at least one common reception beam are in separate ones of the transmission beam groups, and the reception beams are identified based on the transmission beam groups.

19. The apparatus of claim 18, wherein the processing system is further configured to cause the apparatus to:
identify a beam pair for the at least one of the uplink reference signals in response to the channel measurements, the beam pair including the at least one common reception beam and one of the different transmission beams in one of the transmission beam groups; and
refrain from performing subsequent channel measurements with beam pairs in the one of the transmission beam groups.

20. A method of wireless communication at a first wireless device, comprising:
obtaining a plurality of downlink reference signals from a second wireless device, each of the downlink reference signals being associated with a different transmission beam; and
performing a plurality of channel measurements of at least one of the downlink reference signals during a symbol length based on a subcarrier spacing of the at least one of the downlink reference signals.

* * * * *